US008379007B2

(12) United States Patent
Hashimoto et al.

(10) Patent No.: US 8,379,007 B2
(45) Date of Patent: Feb. 19, 2013

(54) PLASMA DISPLAY DEVICE AND METHOD FOR DRIVING PLASMA DISPLAY PANEL

(75) Inventors: Shinichiro Hashimoto, Osaka (JP); Kenji Ogawa, Osaka (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 12/299,520

(22) PCT Filed: Apr. 9, 2008

(86) PCT No.: PCT/JP2008/000912
§ 371 (c)(1), (2), (4) Date: Nov. 4, 2008

(87) PCT Pub. No.: WO2008/132781
PCT Pub. Date: Nov. 6, 2008

(65) Prior Publication Data

US 2009/0167740 A1 Jul. 2, 2009

(30) Foreign Application Priority Data

Apr. 20, 2007 (JP) ................................ 2007-111284

(51) Int. Cl.
*G06F 3/038* (2006.01)

(52) U.S. Cl. ........................................................ 345/208

(58) Field of Classification Search .................... 345/67, 345/208, 62–63
See application file for complete search history.

(56) References Cited

U.S. PATENT DOCUMENTS 5,994,929 A * 11/1999 Sano et al. .................... 327/111
7,468,713 B2 * 12/2008 Ogawa et al. .................. 345/63
7,486,258 B2 * 2/2009 Baik et al. ...................... 345/60
7,812,788 B2 * 10/2010 Jung et al. ...................... 345/60
2002/0008680 A1 * 1/2002 Hashimoto et al. ............ 345/63
2006/0109211 A1 * 5/2006 Jung ............................... 345/67
2007/0097031 A1 * 5/2007 Mima et al. ..................... 345/67
2007/0152918 A1 * 7/2007 Jung ............................... 345/68

FOREIGN PATENT DOCUMENTS

JP 2000-242224 A 9/2000
JP 2007-010702 A 1/2007
JP 2007-033736 A 2/2007
WO WO 02/101707 A1 12/2002
WO WO 2004/055771 A1 7/2004
WO WO 2005/114626 A1 12/2005
WO WO 2006/123599 A1 11/2006
WO WO 2008/007618 A1 1/2008
WO WO 2008/007619 A1 1/2008
WO PCT/JP2008/000912 5/2008

* cited by examiner

*Primary Examiner* — William Boddie
*Assistant Examiner* — Towfiq Elahi
(74) *Attorney, Agent, or Firm* — RatnerPrestia

(57) ABSTRACT

A method for driving a plasma display panel that includes a plurality of discharge cells including a display electrode pair composed of a scan electrode and a sustain electrode. One field period includes a plurality of subfields each including an initializing period, an address period and a sustain period. The method includes applying at least two kinds of sustain pulses to one electrode of the scan electrode and the sustain electrode in the sustain period, the two kinds of sustain pulses including a first sustain pulse as a reference and a second sustain pulse rising more steeply and falling more gently than the first sustain pulse. In the method, a drive waveform voltage applied to the one electrode includes a last drive waveform voltage in the sustain period and a predetermined number of the second sustain pulses continuously disposed immediately before the last drive waveform voltage.

4 Claims, 13 Drawing Sheets

PLASMA DISPLAY DEVICE AND METHOD FOR DRIVING PLASMA DISPLAY PANEL

THIS APPLICATION IS A U.S. NATIONAL PHASE APPLICATION OF PCT INTERNATIONAL APPLICATION PCT/JP2008/000912.

TECHNICAL FIELD

The present invention relates to a plasma display device used in a wall-mounted television and a large-size monitor and to a method for driving a plasma display panel.

BACKGROUND ART

An AC surface discharge panel as a typical plasma display panel (hereinafter, abbreviated as a "panel") includes a front panel and a rear panel disposed facing each other with a large number of discharge cells provided therebetween. The front panel has a plurality of display electrode pairs, each composed of a pair of scan electrode and sustain electrode, formed in parallel to each other on a front glass substrate, and has a dielectric layer and a protective layer formed so as to cover the display electrode pairs. The rear panel includes a plurality of data electrodes formed in parallel to each other on a rear glass substrate, a dielectric layer formed so as to cover the data electrodes, a plurality of barrier ribs formed in parallel to the data electrodes on the dielectric layer. A phosphor layer is formed on the top surface of the dielectric layer and the side surface of the barrier ribs. The front panel and the rear panel are disposed facing each other so that the display electrode pairs three-dimensionally intersect with the data electrodes, and sealed to each other. The discharge space inside thereof is filled with a discharge gas including, for example, xenon at the partial pressure ratio of 5%. Herein, a discharge cell is formed in a portion where the display electrode pair and the data electrode face each other. In a panel having such a configuration, ultraviolet light is generated by gas discharge in each discharge cell, and this ultraviolet light excites phosphor layers for red (R), green (G) and blue (B) to cause light emission for color display.

As a method for driving a panel, a subfield method is generally employed. The subfield method divides one field period into a plurality of subfields, and carries out gradation display by a combination of subfields to emit light.

Each subfield includes an initializing period, an address period, and a sustain period. In the initializing period, initializing discharge is generated and wall charge necessary for a subsequent address operation is formed on each electrode, and priming particles (priming for discharge=excited particles) for stably causing address discharge are generated. In the address period, an address pulse voltage is selectively applied to a discharge cell to be displayed so as to cause address discharge, thus forming wall charge (hereinafter, this operation is also referred to as "address"). In the sustain period, a sustain pulse voltage is applied alternately to the display electrode pair composed of the scan electrode and the sustain electrode so as to cause sustain discharge in a discharge cell in which address discharge has been generated. Thus, a phosphor layer of the corresponding discharge cell is allowed to emit light so as to carry out an image display.

Furthermore, among the subfield methods, there is disclosed a driving method of causing initializing discharge by using a gently changing voltage waveform, further selectively causing initializing discharge with respect to a discharge cell in which sustain discharge has been generated, and thereby reducing light emission that is not related to the gradation display as much as possible to improve a contrast ratio.

Specifically, an all-cell initializing operation for causing initializing discharge in all discharge cells is carried out in the initializing period of one subfield in the plurality of subfields, and a selective initializing operation for causing initializing discharge only in a discharge cell in which sustain discharge has been carried out in the immediately preceding sustain period is carried out in the initializing period of the other subfields. With such driving, brightness in a black display region (hereinafter, abbreviated as "black brightness") changing depending on light emission that is not related to an image display is only feeble light emission in the all-cell initializing operation. Thus, an image display with a high contrast becomes possible (see, for example, patent document 1).

Furthermore, the above-mentioned patent document 1 also discloses so-called narrow width erase discharge in which the pulse width of the last sustain pulse in the sustain period is made to be shorter than the pulse width of other sustain pulses so as to relieve the potential difference by wall charge between the display electrode pairs. This narrow width erase discharge can stabilize an address operation in an address period in the subsequent subfield, and thus, a plasma display device with a high contrast ratio can be realized.

With recent trend toward high resolution of a panel, a discharge cell is becoming finer. It is confirmed that, in the finer discharge cells, a phenomenon called charge drop off in which wall charge is lost easily occurs. When the charge drop off occurs, discharge failure occurs, thus deteriorating the quality of image display or increasing the applied voltage necessary to cause discharge.

One of the main reasons of the charge drop off is discharge variation at the time of address operation. For example, when the discharge variation at the time of the address operation is large and strong address discharge is generated, in a place where a discharge cell to emit light and a discharge cell that does not emit light are adjacent to each other, the discharge cell to emit light may deprive wall charge from the discharge cell that does not emit light, which may lead to the charge drop off.

Therefore, it is important to generate address discharge as stably as possible in order to prevent the charge drop off.

On the other hand, recently, panels having a larger screen and a higher resolution have been developed. Accordingly, a driving impedance of a panel tends to increase. When the driving impedance increases, a waveform distortion such as ringing easily occurs in a drive waveform generated from a drive circuit of the panel. The above-mentioned narrow width erase discharge is generated for stabilizing an address operation in the subsequent subfield. However, for example, when a waveform distortion occurs in a drive waveform for causing this narrow width erase discharge, the narrow width erase discharge itself may strongly occur. In such a case, it is difficult to stably generate subsequent address discharge.

[Patent document 1] Japanese Patent Application Unexamined Publication No. 2000-242224

SUMMARY OF THE INVENTION

A method for driving a panel in accordance with the present invention is a driving method of a panel including a plurality of discharge cells having a display electrode pair composed of a scan electrode and a sustain electrode. One field period includes a plurality of subfields each including an initializing period, an address period and a sustain period. In the sustain period, at least two kinds of sustain pulses are applied to one electrode of the scan electrode and the sustain electrode. The two kinds of sustain pulses include a first sustain pulse as a reference and a second sustain pulse rising more steeply and falling more gently than the first sustain pulse. Furthermore, a drive waveform voltage applied to the one electrode includes a last drive waveform voltage in the sustain period and a predetermined number of the second sustain pulses continuously disposed immediately before the last drive waveform voltage.

With such a configuration, even in a panel having a larger screen and a higher resolution, address discharge can be generated stably and the quality of an image display of the panel can be improved.

Furthermore, in the method for driving a panel in accordance with the present invention, the last drive waveform voltage may be a second inclined waveform voltage that has a steeper gradient than a first inclined waveform voltage in the initializing period of at least one subfield in one field period and is reduced immediately after an increasing waveform voltage reaches a predetermined potential.

Furthermore, the method for driving a panel in accordance with the present invention may be characterized in that the sustain pulse rises or falls by allowing the interelectrode capacitance of the display electrode pair to resonate with an inductor, and a time of the falling period of the second sustain pulse is not less than 1.1 times of a half of a resonance cycle of the interelectrode capacitance and the inductor and less than the resonance cycle.

Furthermore, in the method for driving a panel in accordance with the present invention, the first inclined waveform voltage, the second inclined waveform voltage and the second sustain pulse may be applied to the scan electrode.

REFERENCE MARKS IN THE DRAWINGS

Figure 1:
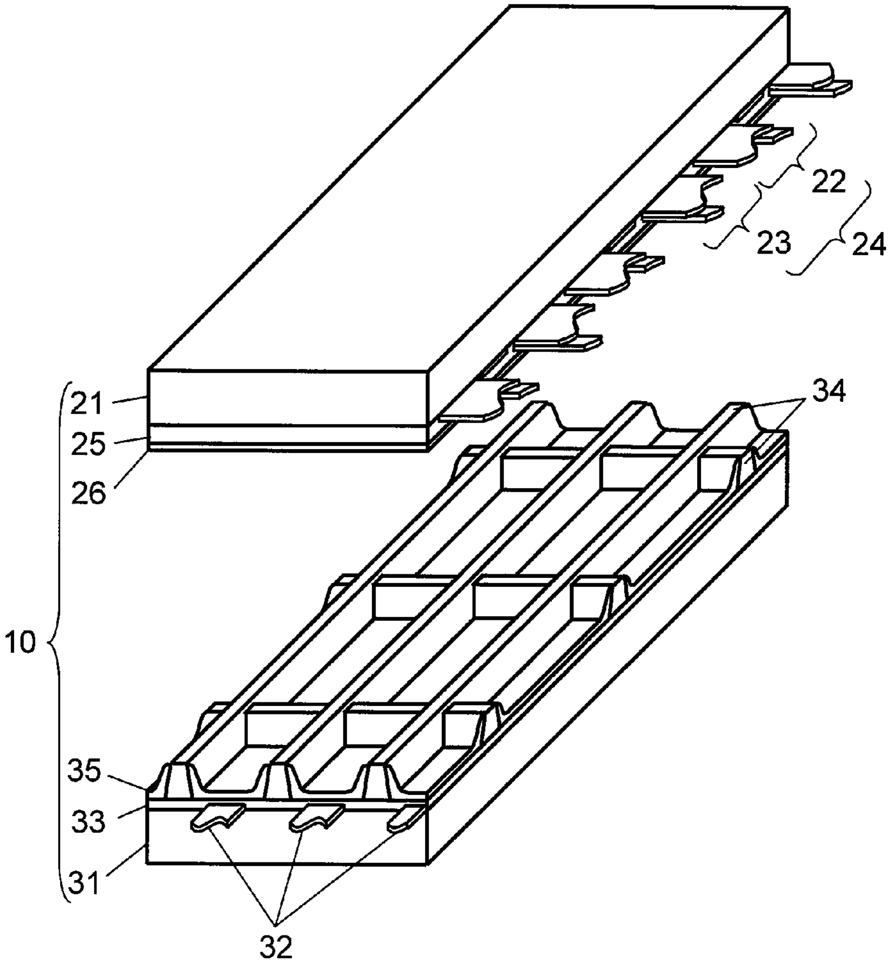
FIG. 1 is an exploded perspective view showing a structure of a panel in accordance with a first exemplary embodiment of the present invention.

1 plasma display device
10 panel
21 (glass) front panel
22 scan electrode
23 sustain electrode
24 display electrode pair
25, 33 dielectric layer
26 protective layer
31 rear panel
32 data electrode
34 barrier rib
35 phosphor layer
41 image signal processing circuit
42 data electrode drive circuit
43 scan electrode drive circuit (drive circuit)
44 sustain electrode drive circuit
45 timing generating circuit
48 lighting rate detecting circuit
50, 60 sustain pulse generating circuit
51, 61 power recovery circuit
52, 62 clamping circuit
53 initializing waveform generating circuit
54 scan pulse generating circuit
55 first Miller integrating circuit
56 second Miller integrating circuit
57 third Miller integrating circuit
Q1, Q2, Q3, Q4, Q11, Q12, Q13, Q14, Q15, Q16, Q21, Q31, Q32, Q33, Q34, Q36, Q37, Q38, Q39, QH1-QHn, QL1-QLn switching element
C1, C10, C11, C12, C21, C30, C31 capacitor
L1, L30 inductor
D1, D2, D12, D13, D21, D31, D32, D33 diode
AG AND gate
CP comparator
R10, R11, R12, R13, R14 resistor

DETAILED DESCRIPTION OF THE PREFERRED EMBODIMENTS

Hereinafter, a plasma display device in accordance with exemplary embodiments of the present invention is described with reference to drawings.

First Exemplary Embodiment

FIG. 1 is an exploded perspective view showing a structure of panel 10 in accordance with the first exemplary embodiment of the present invention. A plurality of display electrode pairs 24 each composed of scan electrode 22 and sustain electrode 23 are formed on glass front panel 21. Dielectric layer 25 is formed so as to cover scan electrode 22 and sustain electrode 23. Protective layer 26 is formed on dielectric layer 25.

Furthermore, protective layer 26 is made of a material containing MgO as a main component, which has been used as a panel material in order to reduce a discharge start voltage in the discharge cell, has a large secondary electron emission coefficient when neon (Ne) and xenon (Xe) gasses are filled, and is excellent in durability.

A plurality of data electrodes 32 are formed on rear panel 31, dielectric layer 33 is formed so as to cover data electrodes 32, and further double-cross-shaped barrier ribs 34 are formed on dielectric layer 33. Phosphor layer 35 emitting red (R), green (G) and blue (B) light is provided on the side surface of barrier ribs 34 and on the top surface of dielectric layer 33.

Front panel 21 and rear panel 31 are disposed facing each other so that display electrode pairs 24 and data electrodes 32 intersect with each other with minute discharge space interposed therebetween. Front panel 21 and rear panel 31 are sealed to each other on the peripheral portions thereof with a sealing agent such as glass frit. A mixture gas including neon and xenon is filled as a discharge gas in the inside of the discharge space. In this exemplary embodiment, in order to improve the light-emitting efficiency, a discharge gas having a partial pressure of xenon of 10% is used. The discharge space is partitioned into a plurality of sections by barrier ribs 34. A discharge cell is formed in a portion where display electrode pair 24 and data electrode 32 intersect with each other. These discharge cells are discharged to emit light, thereby an image is displayed.

Note here that the structure of panel 10 is not necessarily limited to the above-mentioned structure and, for example, a structure having stripe-shaped barrier ribs may be employed. Furthermore, the mixing ratio of the discharge gasses is not limited to the above-mentioned values and may be another mixing ratio.

Figure 2:
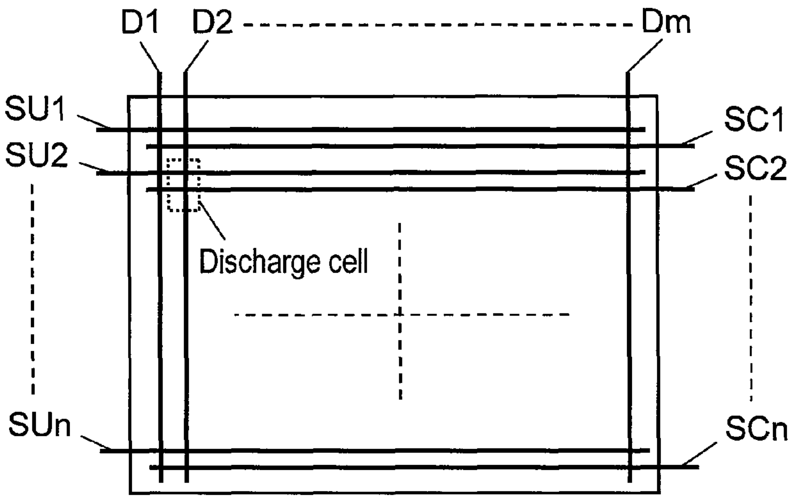
FIG. 2 shows an arrangement of electrodes of the panel.

FIG. 2 shows an arrangement of electrodes of panel 10 in accordance with the first exemplary embodiment of the present invention. On panel 10, n lines of scan electrodes SC1-SCn (scan electrodes 22 in FIG. 1) and n lines of sustain electrodes SU1-SUn (sustain electrodes 23 in FIG. 1), which are long in the row direction, are arranged, as well as m lines of data electrodes D1-Dm (data electrodes 32 in FIG. 1) which are long in the column direction are arranged. A discharge cell is formed in a portion where a pair of scan electrode SCi (i=1 to n) and sustain electrode SUi intersect with one data electrode Dj (j=1 to m). M×n pieces of the discharge cells are formed in discharge space. As shown in FIGS. 1 and 2, since scan electrode SCi and sustain electrode SUi are arranged in parallel to each other so as to form a pair, large interelectrode capacitance Cp exists between scan electrodes SC1-SCn and sustain electrodes SU1-SUn.

Next, a drive waveform voltage for driving panel 10 and the outline of its operation are described. The plasma display device in this exemplary embodiment carries out gradation display by a subfield method, in which one field period is divided into plural subfields, and light emission/non-emission of each discharge cell is controlled for every subfield. Each subfield includes an initializing period, an address period, and a sustain period.

In each subfield, in the initializing period, initializing discharge is generated so as to form wall charge necessary for the subsequent address discharge on each electrode. In addition, priming particles (priming for discharge=excited particles) for reducing discharge delay and causing address discharge stably are generated. The initializing operation at this time includes an all-cell initializing operation for causing initializing discharge in all discharge cells, and a selective initializing operation for causing initializing discharge selectively in only a discharge cell in which sustain discharge has been carried out in the immediately preceding subfield.

In the address period, address discharge is generated selectively so as to form wall charge in a discharge cell to emit light in the subsequent sustain period. Then, in the sustain period, sustain pulses of the number proportional to a brightness weight are alternately applied to display electrode pair 24 so as to cause sustain discharge in a discharge cell in which address discharge has been generated to emit light. The proportional constant at this time is referred to as "brightness magnification."

In this exemplary embodiment, one field includes ten subfields (first SF, second SF, . . . , and tenth SF) and the respective subfields have, for example, brightness weights of 1, 2, 3, 6, 11, 18, 30, 44, 60, and 80. Then, in the initializing period of the first SF, an all-cell initializing operation is carried out; in the initializing periods of the second SF to the tenth SF, a selective initializing operation is carried out. Thus, the light emission unrelated to image display is only light emission accompanying the discharge in the all-cell initializing operation of the first SF. Black brightness, which is brightness in a black display region in which sustain discharge is not generated, is only feeble light emission in the all-cell initializing operation, enabling image display with a high contrast to be carried out. Furthermore, in the sustain period of each subfield, sustain pulses of the number of the brightness weight of each subfield multiplied by a predetermined brightness magnification are applied to each display electrode pair 24.

However, in this exemplary embodiment, the number of subfields and the brightness weight of each subfield are not limited to the above-mentioned values. Furthermore, a configuration in which a subfield structure is changed on the basis of an image signal and the like may be employed.

Note here that in this exemplary embodiment, an inclined waveform voltage is generated in the last part of the sustain period, thus stabilizing an address operation in the address period of the subsequent subfield. Hereinafter, firstly, an outline of the drive waveform voltage is described, and then a configuration of the drive circuit is described.

Figure 3:
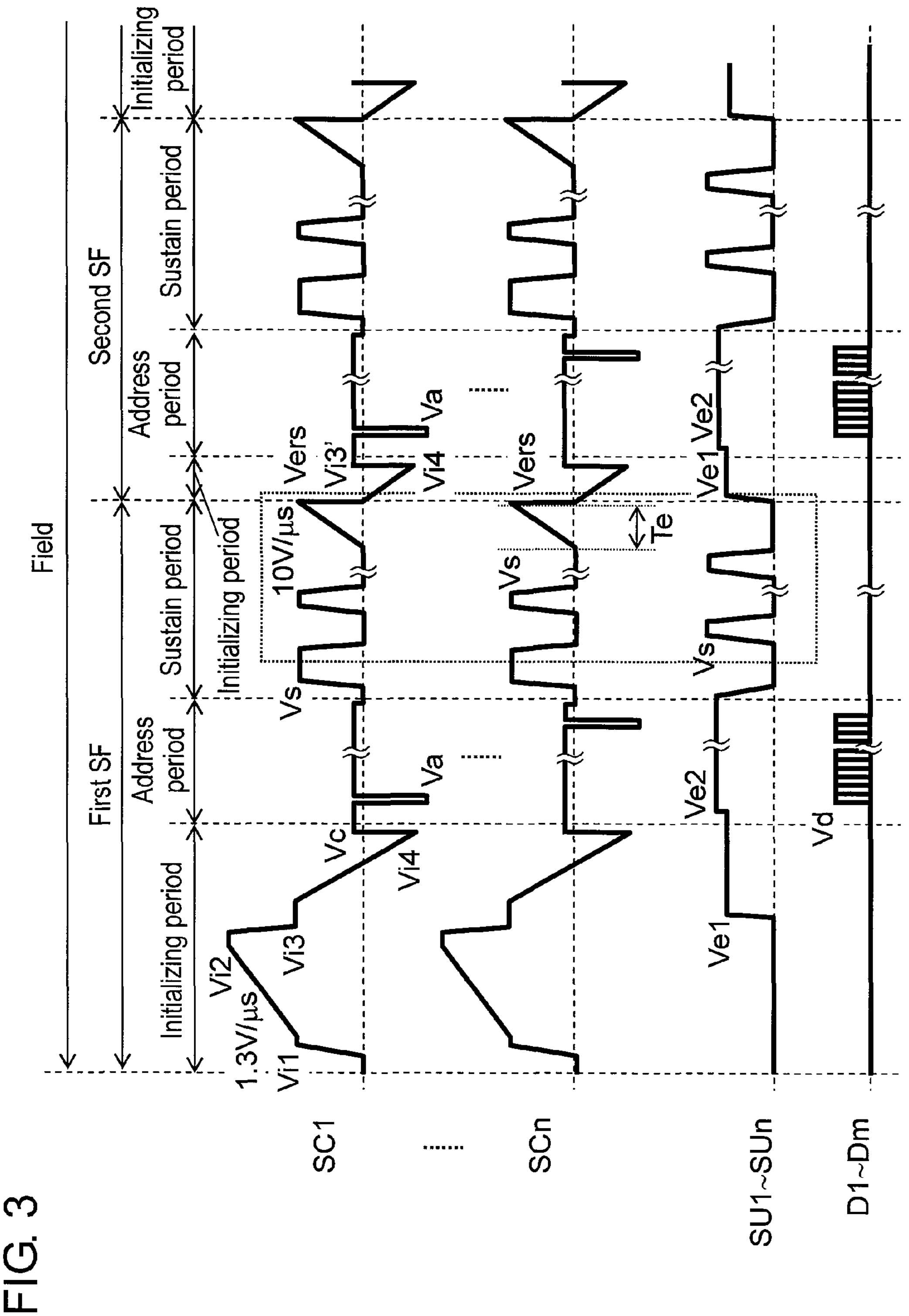
FIG. 3 shows drive waveform voltages applied to each electrode of the panel.

FIG. 3 shows drive waveform voltages applied to each electrode of panel 10 in accordance with the first exemplary embodiment of the present invention. FIG. 3 shows drive waveform voltages of two subfields, that is, a subfield in which an all-cell initializing operation is carried out (hereinafter, referred to as an "all-cell initializing subfield") and a subfield in which a selective initializing operation is carried out (hereinafter, referred to as a "selective initializing subfield"). Also drive waveform voltages in the other subfields are substantially the same. Furthermore, the below-mentioned scan electrode SCi, sustain electrode SUi, and data electrode Dk are electrodes selected from the respective electrodes on the basis of the image data.

Firstly, the first SF that is an all-cell initializing subfield is described.

In the first half of the initializing period of the first SF, a voltage of 0 (V) is applied to data electrodes D1-Dm and sustain electrodes SU1-SUn, respectively. Furthermore, a gently increasing first inclined waveform voltage (hereinafter, referred to as an "up ramp waveform voltage") is applied to scan electrodes SC1-SCn. This up ramp waveform voltage is a voltage gently increasing from voltage Vi1, in which a voltage difference between the voltage on scan electrodes SC1-SCn and the voltage on sustain electrodes SU1-SUn is not more than the discharge start voltage, toward voltage Vi2, in which the voltage difference is more than the discharge start voltage.

In this exemplary embodiment, this up ramp waveform voltage is generated by setting the gradient to be about 1.3 V/μsec.

While this up ramp waveform voltage increases, feeble initializing discharge continuously occurs between scan electrodes SC1-SCn and sustain electrodes SU1-SUn and between scan electrode SC1-SCn and data electrodes D1-Dm, respectively. Then, negative wall voltage accumulates on scan electrodes SC1-SCn and positive wall voltage accumulates on data electrodes D1-Dm and sustain electrodes SU1-SUn. This wall voltage on the electrode is a voltage generated by wall charge accumulated on the dielectric layer, the protective layer, the phosphor layer, and the like, which cover the electrodes.

In the latter half of the initializing period, positive voltage Ve1 is applied to sustain electrodes SU1-SUn, and a voltage of 0 (V) is applied to data electrodes D1-Dm. Furthermore, a gently reducing inclined waveform voltage (hereinafter, referred to as a "down ramp waveform voltage") is applied to scan electrodes SC1-SCn. This down ramp waveform voltage is a voltage gently reducing from voltage Vi3, in which a voltage difference between the voltage on scan electrodes SC1-SCn and the voltage on sustain electrodes SU1-SUn is not more than the discharge start voltage, toward voltage Vi4, in which the difference is more than the discharge start voltage. During this time, feeble initializing discharge continuously occurs between scan electrodes SC1-SCn and sustain electrodes SU1-SUn and between scan electrodes SC1-SCn and data electrodes D1-Dm, respectively. Then, the negative wall voltage on scan electrodes SC1-SCn and the positive wall voltage on sustain electrodes SU1-SUn are weakened. The positive wall voltage on data electrodes D1-Dm is adjusted to a value suitable to an address operation. As mentioned above, the all-cell initializing operation in which the initializing discharge is carried out in all discharge cells is completed.

As shown in the initializing period of the second SF in FIG. 3, a drive waveform voltage excluding the first half of the initializing period may be applied to each electrode. That is to say, voltage Ve1 is applied to sustain electrodes SU1-SUn and a voltage of 0(V) is applied to data electrodes D1-Dm, respectively. A down ramp waveform voltage gently reducing from voltage Vi3' to voltage Vi4 is applied to scan electrodes SC1-SCn. Thus, in the discharge cell in which sustain discharge has been generated in the preceding subfield, feeble initializing discharge is generated, thus weakening the wall voltage on scan electrode SCi and on sustain electrode SUi. Furthermore, in the discharge cell in which sufficient positive wall voltage is accumulated on data electrode Dk (k=1 to m) by the immediately preceding sustain discharge, an excessive portion of the wall voltage is discharged and a wall voltage is adjusted to a suitable one for an address operation. On the other hand, in the discharge cell in which sustain discharge has not been generated in the precedent subfield, discharge is not generated and wall charge at the end of the initializing period in the preceding subfield is kept. Thus, the initializing operation excluding the first part is a selective initializing operation in which initializing discharge is carried out with respect to the discharge cell in which a sustain operation has been carried out in the sustain period of the immediately preceding subfield.

In the subsequent address period, firstly, voltage Ve2 is applied to sustain electrodes SU1-SUn, and voltage Vc is applied to scan electrodes SC1-SCn.

Then, while negative scan pulse voltage Va is applied to scan electrode SC1 in the first row, positive address pulse voltage Vd is applied to data electrode Dk (k=1 to m) of a discharge cell to emit light in the first row in data electrodes D1-Dm. At this time, a voltage difference in the intersection between on data electrode Dk and on scan electrode SC1 results in difference (Vd−Va) of externally applied voltages with the difference between the wall voltage on data electrode Dk and the wall voltage on scan electrode SC1 added, which exceeds the discharge start voltage. Thus, discharge occurs between data electrode Dk and scan electrode SC1. Furthermore, since voltage Ve2 is applied to sustain electrodes SU1-SUn, a voltage difference between on sustain electrode SU1 and voltage on scan electrode SC1 results in difference (Ve2−Va) of externally applied voltages with the difference between the wall voltage on sustain electrode SU1 and the wall voltage on scan electrode SC1 added. At this time, by setting voltage Ve2 to a voltage value somewhat lower than the discharge start voltage, a portion between sustain electrode SU1 and scan electrode SC1 can be made to be a state in which discharge is not carried out but discharge tends to occur. Thus, discharge occurring between data electrode Dk and scan electrode SC1 is used as a trigger, and discharge can be generated between sustain electrode SU1 and scan electrode SC1 in a region in which they cross data electrode Dk. Thus, address discharge occurs in the discharge cell to emit light and positive wall voltage accumulates on scan electrode SC1 and negative wall voltage accumulates on sustain electrode SU1, and negative wall voltage accumulates also on data electrode Dk.

Thus, an address operation of causing address discharge in a discharge cell to emit light in the first row and accumulating wall voltage on each electrode is carried out. On the other hand, since a voltage in the intersection portion between data electrodes D1-Dm in which address pulse voltage Vd has not been applied and scan electrode SC1 does not exceed the discharge start voltage, address discharge does not occur. The above-mentioned address operation is carried out to a discharge cell in the n-th row, and thus, an address period is completed.

In the subsequent sustain period, firstly, positive sustain pulse voltage Vs is applied to scan electrodes SC1-SCn and a ground potential as the base potential, that is, a voltage of 0(V) is applied to sustain electrodes SU1-SUn. Then, in the discharge cell in which address discharge has been generated, the voltage difference between the voltage on scan electrode SCi and the voltage on sustain electrode SUi results in sustain pulse voltage Vs with the voltage difference between the wall voltage on scan electrode SCi and wall voltage on sustain electrode SUi added, which exceeds the discharge start voltage.

Then, sustain discharge occurs between scan electrode SCi and sustain electrode SUi. Ultraviolet light generated at this time allows phosphor layer 35 to emit light. Then, a negative wall voltage accumulates on scan electrode SCi and a positive wall voltage accumulates on sustain electrode SUi. Furthermore, a positive wall voltage accumulates also on data electrode Dk. In the discharge cell in which address discharge has not been generated in the address period, sustain discharge is not generated and a wall voltage at the end of the initializing period is sustained.

Next, 0 (V) that is the base potential is applied to scan electrodes SC1-SCn and sustain pulse voltage Vs is applied to sustain electrodes SU1-SUn, respectively. Then, since the voltage difference between the voltage on sustain electrode SUi and the voltage on scan electrode SCi exceeds the discharge start voltage in a discharge cell in which sustain discharge has been generated, sustain discharge is generated between sustain electrode SUi and scan electrode SCi and a negative wall voltage accumulates on sustain electrode SUi and a positive wall voltage accumulates on scan electrode SCi. In the same way since then, sustain pulses of the number of the brightness weight multiplied by brightness magnification are applied alternately to scan electrodes SC1-SCn and sustain electrodes SU1-SUn so as to provide potential difference between the electrodes of display electrode pair 24. Thus, sustain discharge is continuously carried out in the discharge cell in which an address discharge is generated in the address period.

Then, at the end of the sustain period, a second inclined waveform voltage (hereinafter, referred to as an "erase ramp waveform voltage") gently increasing from 0 (V) that is the base potential to voltage Vers is applied to scan electrodes SC1-SCn. Thus, feeble discharge can be generated continuously and a part or all of the wall voltage on scan electrode SCi and sustain electrode SUi are erased with the positive wall voltage on data electrode Dk left.

Specifically, after the voltage on sustain electrodes SU1-SUn is returned to 0 (V), the erase ramp waveform voltage as the second inclined waveform voltage, increasing from 0 (V) that is the base potential toward voltage Vers that is more than the discharge start voltage, is generated at, for example, a gradient of about 10 V/μsec, and is applied to scan electrodes SC1-SCn. Herein, the erase ramp waveform voltage has a steeper gradient than the up ramp waveform voltage as the first inclined waveform voltage. Then, feeble discharge is generated between sustain electrode SUi and scan electrode SCi in a discharge cell in which sustain discharge has been generated. Then, this feeble discharge is continuously generated during the period in which the voltage applied to scan electrodes SC1-SCn increases. Then, immediately after the increasing voltage reaches voltage Vers that is a predetermined potential, the voltage applied to scan electrodes SC1-SCn is reduced to 0 (V) that is the base potential. That is to say, in the initializing period of at least one subfield in one field period, the gently increasing first inclined waveform voltage is generated. At the end of the sustain period, the second inclined waveform voltage, which has a steeper gradient than that of the first inclined waveform voltage and is reduced immediately after the increasing waveform voltage reaches a predetermined voltage, is generated.

At this time, charged particles generated by this feeble discharge are always accumulated as wall charge on sustain electrode SUi and on scan electrode SCi so as to release the voltage difference between sustain electrode SUi and scan electrode SCi. Thus, a wall voltage between scan electrodes SC1-SCn and sustain electrodes SU1-SUn is weakened to the level of the difference between the voltage applied to scan electrode SCi and the discharge start voltage (i.e., voltage Vers -discharge start voltage) with the positive wall charge on data electrode Dk left. Hereinafter, the last discharge in the sustain period generated by this erase ramp waveform voltage is referred to as "erase discharge."

Note here that this exemplary embodiment employs a configuration in which immediately after the voltage applied to scan electrodes SC1-SCn reaches voltage Vers, the voltage is reduced to 0 (V) that is the base potential. This is because it is experimentally confirmed that after the increasing voltage reaches voltage Vers and if this voltage is sustained, abnormal discharge tends to occur in the discharge cells of the below mentioned three conditions.

(1) Discharge cell that itself does not emit light (discharge cell in which address is not carried out in the subfield)

(2) Discharge cell whose adjacent cell emits light (discharge cell in which address has been carried out in the subfield)

(3) Discharge cell that itself causes sustain discharge in the immediately preceding subfield It is desirable that this abnormal discharge is prevented from occurring because it induces error discharge in the subsequent address period. Therefore, this exemplary embodiment has a configuration in which when an erase ramp waveform voltage is generated, immediately after a voltage applied to scan electrodes SC1-SCn reaches voltage Vers, it is reduced to 0 (V) that is the base potential. As a result, while this abnormal discharge is prevented from occurring, a wall voltage in a discharge cell can be suitably adjusted so that a subsequent address operation can be carried out stably.

Since an operation in the subsequent subfield is substantially the same as the above-mentioned operation except for the number of sustain pulses in the sustain period, the description thereof is omitted. The above mention is an outline of the drive waveform voltage applied to each electrode of panel 10 in this exemplary embodiment.

In this exemplary embodiment, a voltage value of voltage Vers is set to sustain pulse voltage Vs+3 (V), for example, about 213 (V). Herein, it is desirable that voltage value of voltage Vers is set to a voltage range of not less than sustain pulse voltage Vs−10 (V) and not more than sustain pulse voltage Vs+10 (V). When the voltage value of voltage Vers is set to be larger than this upper limit value, the adjustment of the wall voltage is excessive; and when the voltage value of voltage Vers is set to be smaller than this lower limit value, the adjustment of the wall voltage is insufficient. In any case, the subsequent address operation may not be carried out stably.

Furthermore, this exemplary embodiment describes a configuration in which the gradient of the erase ramp waveform voltage is set to about 10 V/μsec. It is desirable that this gradient is set to be not less than 2 V/μsec and not more than 20 V/μsec. When the gradient is set to be steeper than this upper limit value, discharge for adjusting the wall voltage does not become feeble. Meanwhile, the gradient is set to be gentler than this lower limit value, discharge itself becomes too feeble, which may cause failure in adjustment of the respective wall voltages.

Figure 4:
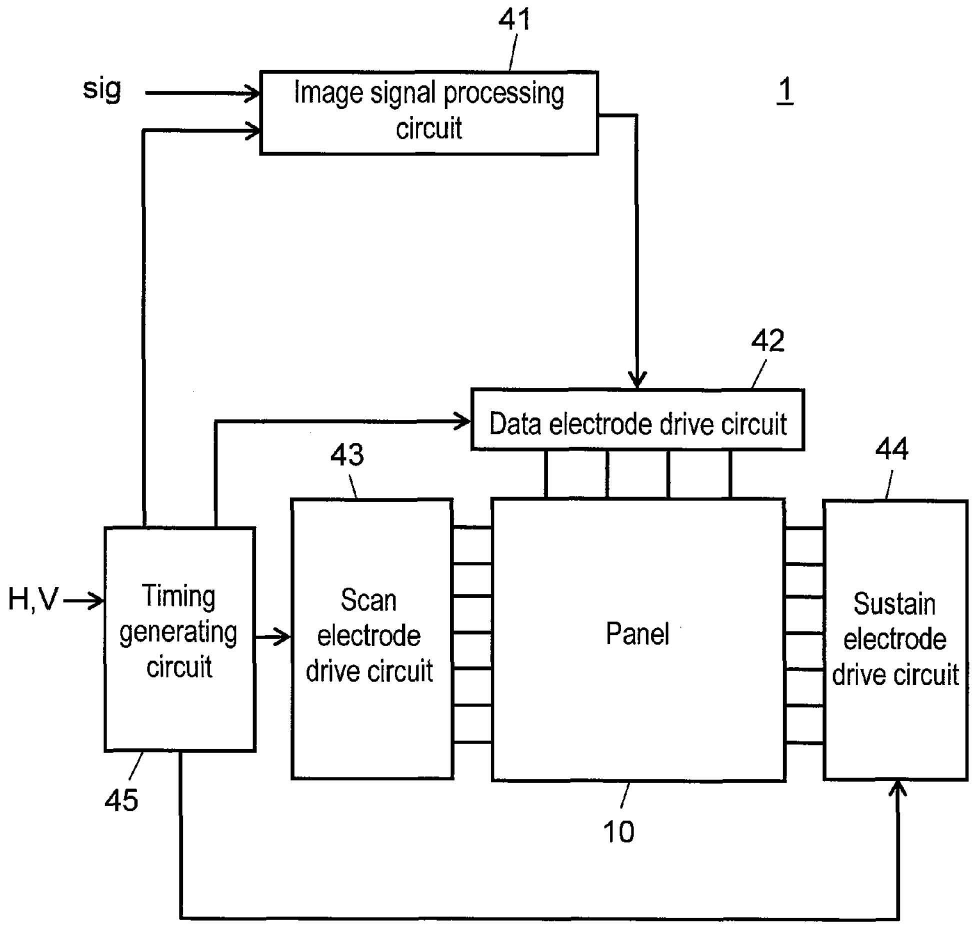
FIG. 4 is a circuit block diagram showing a plasma display device in accordance with the first exemplary embodiment of the present invention.

Next, a configuration of a plasma display device in this exemplary embodiment is described. FIG. 4 is a circuit block diagram showing a plasma display device in accordance with the first exemplary embodiment of the present invention. Plasma display device 1 includes panel 10, image signal processing circuit 41, data electrode drive circuit 42, scan electrode drive circuit 43, sustain electrode drive circuit 44, timing generating circuit 45 and power supply circuit (not shown) for supplying power supply necessary for each circuit block.

Image signal processing circuit 41 converts an input image signal sig into image data showing light emission/non-light emission for every subfield. Data electrode drive circuit 42 converts image data for every subfield into a signal corresponding to each of data electrodes D1-Dm so as to drive each of data electrodes D1-Dm.

Timing generating circuit 45 generates various types of timing signals for controlling the operation of each circuit block on the basis of horizontal synchronizing signal H and vertical synchronizing signal V so as to supply each circuit block. Then, as mentioned above, this exemplary embodiment has a configuration in which the erase ramp waveform voltage is generated at the end of the sustain period. A timing signal according to this is output to scan electrode drive circuit 43 and sustain electrode drive circuit 44. Thus, stable initializing discharge is realized, thus stabilizing an address operation.

Scan electrode drive circuit 43 includes an initializing waveform generating circuit (not shown), a sustain pulse generating circuit (not shown) and a scan pulse generating circuit (not shown). Herein, the initializing waveform generating circuit generates an initializing waveform voltage applied to scan electrodes SC1-SCn in the initializing period. The sustain pulse generating circuit generates a sustain pulse applied to scan electrodes SC1-SCn in the sustain period. Furthermore, the scan pulse generating circuit generates a scan pulse voltage applied to scan electrodes SC1-SCn in an address period. Scan electrode drive circuit 43 drives each of scan electrodes SC1-SCn on the basis of the timing signal. Sustain electrode drive circuit 44 includes a sustain pulse generating circuit (not shown) and a circuit for generating voltage Ve1 and voltage Ve2, and drives each of sustain electrodes SU1-SUn on the basis of the timing signal.

Figure 5:
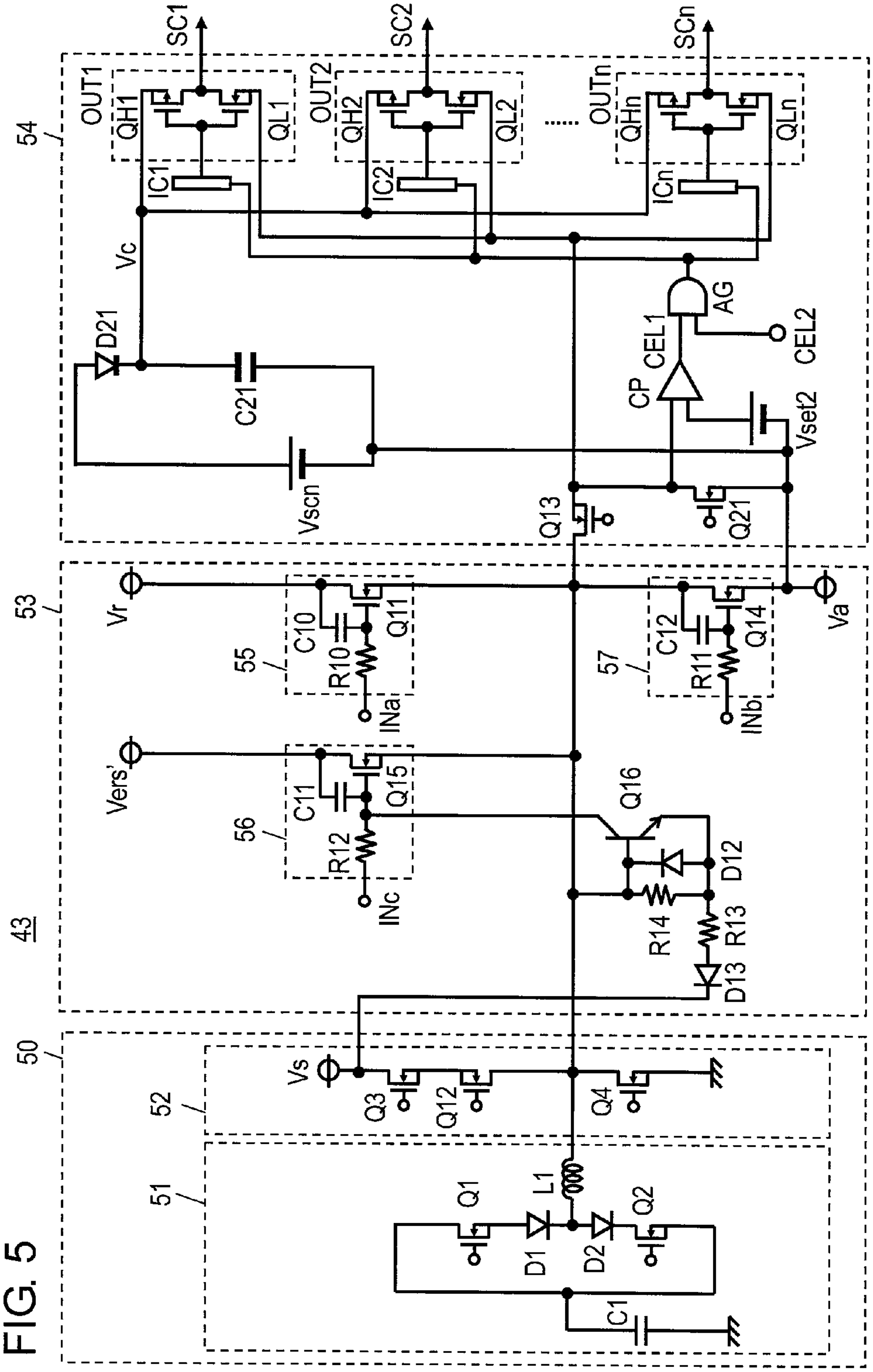
FIG. 5 is a circuit diagram showing a scan electrode drive circuit in accordance with the first exemplary embodiment of the present invention.

Next, scan electrode drive circuit 43 is described. FIG. 5 is a circuit diagram showing scan electrode drive circuit 43 in accordance with the first exemplary embodiment of the present invention. Scan electrode drive circuit 43 includes sustain pulse generating circuit 50 for generating a sustain pulse, initializing waveform generating circuit 53 for generating an initializing waveform, and scan pulse generating circuit 54 for generating a scan pulse. Note here that FIG. 5 shows an isolating circuit using switching element Q12 and an isolating circuit using switching element Q13. In the below mentioned description, an operation for making a switching element to be conductive is expressed by "on," an operation for blocking is expressed by "off," a signal for turning the switching element on is expressed by "Hi," and a signal for turning the switching element off is expressed by "Lo."

Sustain pulse generating circuit 50 includes power recovery circuit 51 and clamping circuit 52. Power recovery circuit 51 includes capacitor C1 for recovering electric power, switching element Q1, switching element Q2, back-flow preventing diode D1, back-flow preventing diode D2, and inductor for resonance L1. Note here that capacitor C1 for recovering electric power has sufficiently larger capacitance than interelectrode capacitance Cp and is charged to about Vs/2 that is a half of voltage value Vs so that it acts as a power supply for power recovery circuit 51. Clamping circuit 52 includes switching element Q3 for clamping scan electrodes SC1-SCn to voltage Vs and switching element Q4 for clamping scan electrodes SC1-SCn to voltage of 0 (V), changing the switching elements on the basis of the timing signal output from timing generating circuit 45 so as to generate sustain pulse voltage Vs.

In sustain pulse generating circuit 50, when, for example, a sustain pulse waveform is allowed to rise, switching element Q1 is turned on so as to allow interelectrode capacitance Cp and inductor L1 to resonate with each other. Then, electric power is supplied from power recovery capacitor C1 to scan electrodes SC1-SCn via switching element Q1, diode D1 and inductor L1. Then, at the time when voltages on scan electrodes SC1-SCn approach voltage Vs, switching element Q3 is turned on and scan electrodes SC1-SCn are clamped to voltage Vs. Note here that even when switching element Q12 is turned off, a parasitic diode called a body diode is generated in antiparallel to a part in which a switching operation is carried out in MOSFET. Herein, antiparallel signifies that a direction, which is parallel to the portion in which a switching operation is carried out and which is opposite to the direction in which an electric current flows by the switching operation, becomes a forward direction. As a result, when switching element Q3 is turned on, scan electrodes SC1-SCn can be clamped to voltage Vs via this body diode.

On the contrary, when a sustain pulse waveform is allowed to fall, switching element Q2 is turned on so as to allow interelectrode capacitance Cp and inductor L1 to resonate with each other and to recover electric power to power recovery capacitor C1 from interelectrode capacitance Cp via inductor L1, diode D2, and switching element Q2. Then, at the time when the voltage on scan electrodes SC1-SCn approaches a voltage of 0 (V), switching element Q4 is turned on and the voltage on scan electrodes SC1-SCn is clamped to 0 (V).

Furthermore, this exemplary embodiment has a configuration having an inclined waveform generating circuit for generating an erase ramp waveform voltage besides an inclined waveform generating circuit for generating an up ramp waveform voltage at the time of the initializing operation. Specifically, initializing waveform generating circuit 53 includes first Miller integrating circuit 55, second Miller integrating circuit 56 and third Miller integrating circuit 57. Herein, first Miller integrating circuit 55 is a first inclined waveform generating circuit including switching element Q11, capacitor C10 and resistor R10 and generating an up ramp waveform voltage gently increasing in a ramp shape toward voltage Vi2. Furthermore, second Miller integrating circuit 56 is a second inclined waveform generating circuit including switching element Q15, capacitor C11 and resistor R12 and generating an erase ramp waveform voltage gently increasing in a ramp shape toward voltage Vers. Then, third Miller integrating circuit 57 is a third inclined waveform generating circuit including switching element Q14, capacitor C12 and resistor R11 and generating a down ramp waveform voltage gently decreasing in a ramp shape toward voltage Vi4. In FIG. 5, respective input terminals of the Miller integrating circuits are denoted by input terminal INa, input terminal INb and input terminal INc.

Furthermore, in this exemplary embodiment, in order to precisely stop the increase of the voltage at voltage Vers at the time when the erase ramp waveform voltage is generated, there is provided a switching circuit for comparing the erase ramp waveform voltage with voltage Vers and stopping the operation of the second Miller integrating circuit that generates the erase ramp waveform voltage immediately after the erase ramp waveform voltage reaches voltage Vers. Specifically, back-flow preventing diode D13, resistor R13 for adjusting voltage value of voltage Vers, switching element Q16 for turning input terminal Inc of second Miller integrating circuit 56 into "Lo" when a voltage output from initializing waveform generating circuit 53 reaches voltage Vers, protective diode D12, and resistor R14 are provided.

Switching element Q16 is made of a generally-used NPN transistor and has a base connected to an output of initializing waveform generating circuit 53, a collector connected to input terminal INc of second Miller integrating circuit 56, and an emitter connected to voltage Vs via serially connected resistor R13 and diode D13. Resistor R13 sets its resistance value so that switching element Q16 is turned on when a voltage output from initializing waveform generating circuit 53 reaches voltage Vers. Therefore, when a voltage output from initializing waveform generating circuit 53 reaches voltage Vers, switching element Q16 is turned on. Then, since an electric current input into input terminal INc in order to operate second Miller integrating circuit 56 is pulled out by switching element Q16, an operation of second Miller integrating circuit 56 is stopped.

In general, in the Miller integrating circuit, a gradient of the ramp waveform to be generated tends to be affected by variation of elements constituting the circuit. Therefore, when the waveform is formed only in the operation period of the Miller integrating circuit, the maximum voltage value of the ramp waveform tends to vary. Meanwhile, in this exemplary embodiment, it is confirmed that it is desirable that a maximum voltage value of an erase ramp waveform voltage is in ±3 (V) with respect to the intended voltage value. By using a configuration in accordance with this exemplary embodiment, it can be in ±1 (V) with respect to the intended voltage value. Thus, it is possible to generate an erase ramp waveform voltage with high accuracy.

Note here that it is desirable that voltage Vers' is set to be higher than voltage Vers. In this exemplary embodiment, voltage Vers' is set to Vs+30 (V). Furthermore, in this exemplary embodiment, a resistance value of resistor R13 is set so that voltage Vers is voltage Vs+3 (V). Specifically, resistor R13 is set to 100Ω, voltage Vs is set to 210 (V), and resistor R14 is set to 1 kΩ. However, these values are just set on the basis of a 42-inch panel having 1080 display electrode pairs, and the values may be optimized according to characteristics of the panel, specifications of the plasma display devices, or the like.

Initializing waveform generating circuit 53 generates the above-mentioned initializing waveform voltage or erase ramp waveform voltage on the basis of the timing signal output from timing generating circuit 45.

For example, when the up ramp waveform voltage in the initializing waveform is generated, a constant current for a predetermined voltage (for example, 15 (V)) is input into input terminal INa so as to turn input terminal INa into "Hi". Thus, a constant current flow from resistor R10 toward capacitor C10, a source voltage of switching element Q11 increases in a ramp shape, and an output voltage of scan electrode drive circuit 43 also starts to increase in a ramp shape.

Furthermore, when a down ramp waveform voltage in the initializing waveform in the all-cell initializing operation and the selective initializing operation is generated, a constant current for a predetermined voltage (for example, 15 (V)) is input into input terminal INb so as to turn input terminal INb into "Hi". Then, a constant current flow from resistor R11 toward capacitor C12, a drain voltage of switching element Q14 decreases in a ramp shape, and an output voltage of scan electrode drive circuit 43 also starts to decrease in a ramp shape.

Furthermore, when an erase ramp waveform voltage is generated in the end of the sustain period, a constant current for a predetermined voltage is input into input terminal INc so as to turn input terminal INc into "Hi". Thus, a constant current flow from resistor R12 toward capacitor C11, a source voltage of switching element Q15 increases in a ramp shape, and an output voltage of scan electrode drive circuit 43 also starts to increase in a ramp shape. In this exemplary embodiment, the resistance value of resistor R12 is made to be smaller than the resistance value of resistor R10. Thus, the erase ramp waveform voltage as the second inclined waveform voltage is generated with a steeper gradient than that of the up ramp waveform voltage as the first inclined waveform voltage.

Then, when a drive waveform voltage output from initializing waveform generating circuit 53 gradually increases and becomes higher than voltage Vers, switching element Q16 is turned on. A constant current input into input terminal INc is pulled out by switching element Q16 and an operation of second Miller integrating circuit 56 is stopped. Thus, a drive waveform voltage output from initializing waveform generating circuit 53 is immediately reduced to 0 (V) that is the base potential. Thus, in this exemplary embodiment, the increase of the voltage at the time of generating the erase ramp waveform voltage is precisely stopped at voltage Vers that is a predetermined potential. Immediately thereafter, the voltage is reduced to a voltage of 0 (V) that is the base potential.

Scan pulse generating circuit 54 includes switching circuits OUT1-OUTn, switching element Q21, control circuits IC1-ICn, diode D21 and capacitor C21. Herein, switching circuits OUT1-OUTn output a scan pulse voltage to each of scan electrodes SC1-SCn. Furthermore, switching element Q21 clamps the low voltage sides of switching circuits OUT1-OUTn to voltage Va. Then, control circuits IC1-ICn control switching circuits OUT1-OUTn. Furthermore, diode D21 and capacitor C21 apply voltage Vc obtained by superimposing voltage Va to voltage Vscn to the higher voltage side of switching circuits OUT1-OUTn. Then, each of switching circuits OUT1-OUTn includes switching elements QH1-QHn for outputting voltage Vc and switching elements QL1-QLn for outputting voltage Va. Then, scan pulse voltage Va applied to scan electrodes SC1-SCn in the address period on the basis of the timing signal output from timing generating circuit 45 is sequentially generated. Scan pulse generating circuit 54 outputs a voltage waveform of initializing waveform generating circuit 53 as it is in the initializing period, and outputs a voltage waveform of sustain pulse generating circuit 50 as it is in the sustain period.

Since an extremely large amount of electric current flows in switching elements Q3, Q4, Q12 and Q13, these switching elements use a plurality of FET, IGBT, and the like, which are connected in parallel to each other, so as to reduce impedance.

Furthermore, scan pulse generating circuit 54 includes AND gate AG for carrying out an AND operation and comparator CP for comparing bigness or smallness of input signals input into two input terminals. Comparator CP compares voltage (Va+Vset2) obtained by superimposing voltage Vset2 to voltage Va and a drive waveform voltage with each other. Comparator CP outputs "0" when the drive waveform voltage is higher than voltage (Va+Vset2), and outputs "1" otherwise. To AND gate AG, two input signals, that is, output signal CELL of comparator CP and switching signal CEL2 are input. As switching signal CEL2, for example, a timing signal output from timing generating circuit 45 can be used. Then, AND gate AG outputs "1" when both input signals are "1" and outputs "0" otherwise. The output of AND gate AG is input into control circuits IC1-ICn. When the output of AND gate AG is "0", a drive waveform voltage is output via switching elements QL1-QLn. When the output of AND gate AG is "1", voltage Vc obtained by superimposing voltage Vscn to voltage Va is output via switching elements QH1-QHn.

In this exemplary embodiment, a Miller integrating circuit using a practical and relatively simple-structured FET is employed for a first, second and third inclined waveform generating circuits. However, an inclined waveform generating circuit is not limited to this configuration, and any circuits may be used as long as they can generate an up ramp waveform voltage and a down ramp waveform voltage.

Figure 6:
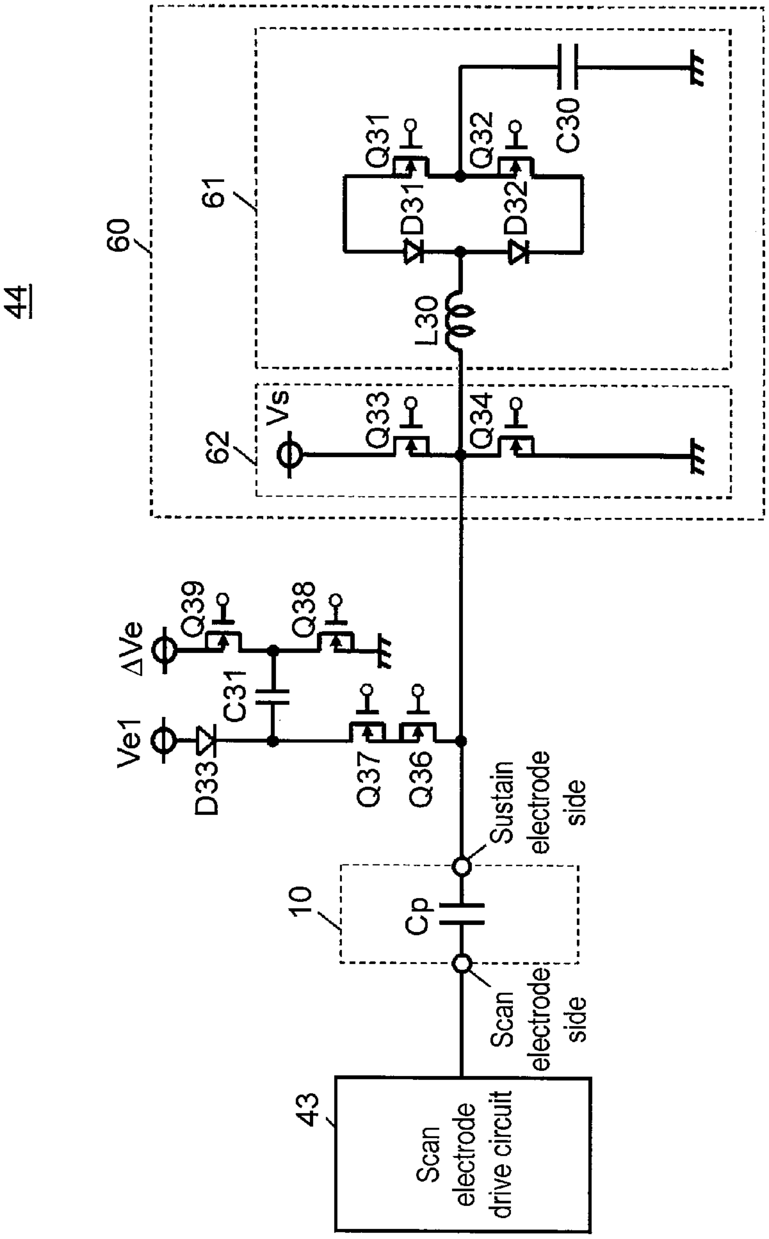
FIG. 6 is a circuit diagram showing a sustain electrode drive circuit in accordance with the first exemplary embodiment of the present invention.

Next, sustain electrode drive circuit 44 is described. FIG. 6 is a circuit diagram showing sustain electrode drive circuit 44 in accordance with the first exemplary embodiment of the present invention. In FIG. 6, an interelectrode capacitance of panel 10 is denoted by Cp.

Sustain pulse generating circuit 60 of sustain electrode drive circuit 44 has substantially the same configuration as that of sustain pulse generating circuit 50 of scan electrode drive circuit 43. That is to say, sustain pulse generating circuit 60 includes power recovery circuit 61 for recovering electric power at the time of driving sustain electrodes SU1-SUn and reusing it, and clamping circuit 62 for clamping sustain electrodes SU1-SUn to voltage Vs and a voltage of 0 (V). Then, sustain pulse generating circuit 60 is connected to sustain electrodes SU1-SUn that are one end of interelectrode capacitance Cp of panel 10.

Power recovery circuit 61 includes power recovery capacitor C30, switching element Q31, switching element Q32, back-flow preventing diode D31, back-flow preventing diode D32, and inductor L30 for resonance. Then, sustain pulse is allowed to rise and fall by allowing interelectrode capacitance Cp and inductor L30 to LC-resonate with each other. Clamping circuit 62 has switching element Q33 for clamping sustain electrodes SU1-SUn to voltage Vs and switching element Q34 for clamping sustain electrodes SU1-SUn to voltage of 0 (V). Then, clamping circuit 62 connects sustain electrodes SU1-SUn to power supply VS via switching element Q33 so as to clamp them to voltage Vs, and connects sustain electrodes SU1-SUn to the ground via switching element Q34 so as to clamp them to 0 (V).

Furthermore, sustain electrode drive circuit 44 includes power supply VE1, switching element Q36, switching element Q37, power supply ΔVE, back-flow preventing diode D33, capacitor C31, switching element Q38, and switching element Q39. Herein, power supply VE1 generates voltage Ve1 and applies voltage Ve1 to sustain electrodes SU1-SUn. Power supply ΔVE generates voltage ΔVe. Furthermore, sustain electrode drive circuit 44 includes capacitor C31 for pump-up and piles up voltage ΔVe to voltage Ve1 so as to obtain Ve2.

For example, at the timing when voltage Ve1 shown in FIG. 3 is applied, switching element Q36 and switching element Q37 are made to be conductive, and positive voltage Ve1 is applied to sustain electrodes SU1-SUn via diode D33, switching element Q36, and switching element Q37. Note here that at this time, switching element Q38 is made to be conductive, and is charged so that the voltage of capacitor C31 is voltage Ve1. Furthermore, at the timing when voltage Ve2 shown in FIG. 3 is applied, while switching element Q36 and switching element Q37 are remained to be conductive, switching element Q38 is blocked and switching element Q39 is made to be conductive. Thus, voltage ΔVe is superimposed to the voltage of capacitor C31, and voltage (Ve1+ΔVe), that is, voltage Ve2, is applied to sustain electrodes SU1-SUn. At this time, by the action of back-flow preventing diode D33, an electric current from capacitor C31 to power supply VE1 is blocked.

Figure 7:
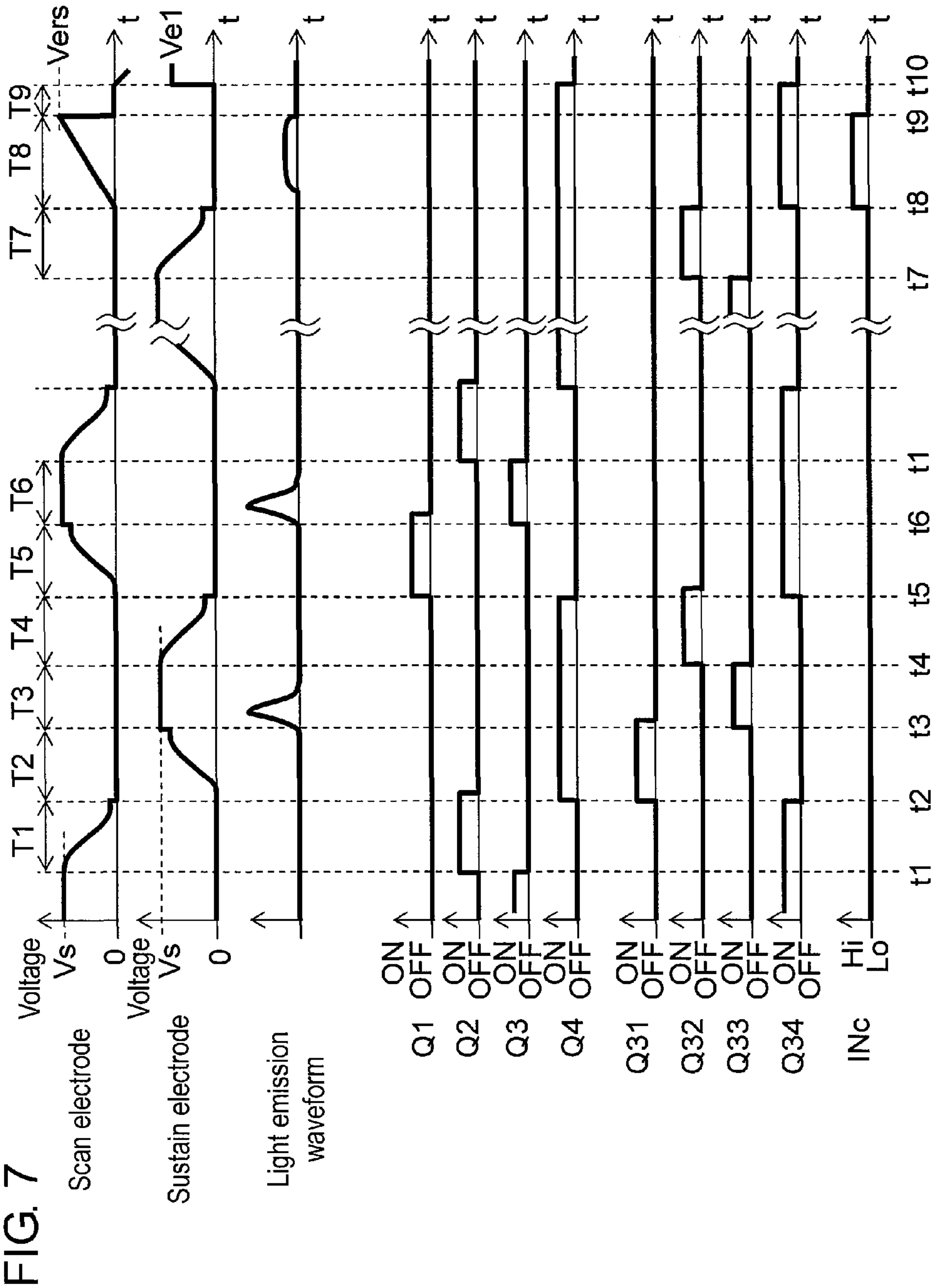
FIG. 7 is a timing chart to illustrate one example of an operation of the scan electrode drive circuit and the sustain electrode drive circuit in accordance with the first exemplary embodiment of the present invention.

Next, a detail of the drive waveform voltage in the sustain period is described. FIG. 7 is a timing chart to illustrate one example of an operation of scan electrode drive circuit 43 and sustain electrode drive circuit 44 in accordance with the first exemplary embodiment of the present invention. FIG. 7 is a detailed timing chart of a portion surrounded by a dotted line in FIG. 3. Firstly, one cycle of repetitive cycles of the sustain pulse is divided into six periods shown by T1 to T6. Each period is described. This repetitive cycle is an interval of the sustain pulse repeatedly applied to the display electrode pair in the sustain period, and represents, for example, cycle repeated by periods T1 to T6. Note here that FIG. 7 is described with reference to a positive waveform. The present invention is not limited to this alone. For example, an exemplary embodiment of a negative waveform is omitted, but the same effect can be obtained by the negative waveform. That is to say, when “rising” in the positive waveform in the below-mentioned description is read as “falling” in the negative waveform; and “falling” in the positive waveform in the below-mentioned description is read as “rising” in the negative waveform, the same effect can be obtained. Furthermore, in the drawings, a signal for turning a switching element on is expressed by “ON” and a signal for turning a switching element off is expressed by “OFF.”

(Period T1)

Switching element Q2 is turned on at time t1. Then, electric charge at the side of scan electrodes SC1-SCn starts to flow to capacitor C1 via inductor L1, diode D2, and switching element Q2, and thus voltage of scan electrodes SC1-SCn starts to decrease. Since inductor L1 and interelectrode capacitance Cp form a resonance circuit, voltage of scan electrodes SC1-SCn is reduced to about 0 (V) at time t2 that is a time after ½ of the resonance cycle has elapsed. However, voltage of scan electrodes SC1-SCn is not reduced to 0 (V) due to a power loss by a resistor component of the resonance circuit, and the like. During this time, switching element Q34 is sustained to be on.

(Period T2)

Switching element Q4 is turned on at time t2. Then, since scan electrodes SC1-SCn are directly connected to the ground via switching element Q4, the voltage of scan electrodes SC1-SCn is forced to be reduced to 0 (V).

Furthermore, switching element Q31 is turned on at time t2. Then, an electric current starts to flow from power recovery capacitor C30 via switching element Q31, diode D31 and inductor L30, and voltage of sustain electrodes SU1-SUn starts to increase. Since inductor L30 and interelectrode capacitance Cp form a resonance circuit, the voltage of sustain electrodes SU1-SUn increases to about voltage Vs at the time t3 that is a time after ½ of the resonance cycle has elapsed. However, the voltage of sustain electrodes SU1-SUn does not increase to voltage Vs due to a power loss by a resistor component of the resonance circuit, and the like.

(Period T3)

Switching element Q33 is turned on at time t3. Then, since sustain electrodes SU1-SUn are directly connected to power supply VS via switching element Q33, the voltage of sustain electrodes SU1-SUn is forced to be increased to voltage Vs. Then, in a discharge cell in which address discharge has been generated, a voltage between scan electrode SCi and sustain electrode SUi exceeds a discharge start voltage, and the sustain discharge is generated.

(Periods T4 to T6)

A sustain pulse applied to scan electrodes SC1-SCn and a sustain pulse applied to sustain electrodes SU1-SUn have the same waveform, and the operations in periods T4 to T6 are equal the operations in periods T1 to T3 in which driving is carried out in a state in which scan electrodes SC1-SCn are replaced by sustain electrodes SU1-SUn. Therefore, the description thereof is omitted.

Note here that switching element Q2 may be turned off at any time from time t2 to time t5, and switching element Q31 may be turned off at any time from time t3 to time t4. Furthermore, switching element Q32 may be turned off at any time from time t5 to next time t2, and switching element Q1 may be turned off at any time from time t6 to next time t1. Furthermore, in order to reduce the output impedance of sustain pulse generating circuits 50 and 60, it is desirable that switching element Q34 is turned off immediately before time t2, switching element Q3 is turned off immediately before time t1, switching element Q4 is turned off immediately before time t5, and switching element Q33 is turned off immediately before time t4.

In the sustain period, the above-mentioned operations in periods T1 to T6 are repeated according to the necessary number of pulses. Thus, the sustain pulse voltage changing from 0 (V) that is the base potential to voltage Vs that is a potential for causing sustain discharge is alternately applied to display electrode pair 24 so as to cause sustain discharge in the discharge cell.

Next, an operation for generating an erase ramp waveform voltage at the end of the sustain period is described.

(Period T7)

This period is a falling period of the sustain pulse applied to sustain electrodes SU1-SUn and is the same as period T4. That is to say, switching element Q33 is turned off immediately before time t7, and switching element Q32 is turned on at time t7. Thereby, electric charge at the side of sustain electrodes SU1-SUn starts to flow to capacitor C30 via inductor L30, diode D32 and switching element Q32, and a voltage of sustain electrodes SU1-SUn starts to be reduced. Furthermore, switching element Q4 is sustained to be on and a voltage of scan electrodes SC1-SCn is sustained to be 0 (V) that is the base potential.

(Period T8)

Switching element Q34 is turned on at time t8 to force the voltage of sustain electrodes SU1-SUn to be reduced to 0 (V).

Furthermore, input terminal INc is set to “Hi” at time t8. Thus, a constant electric current flows from resistor R12 toward capacitor C11 and a source voltage of switching element Q15 increases in a ramp shape and an output voltage of scan electrode drive circuit 43 starts to increase in a ramp shape with a steeper gradient than that of the up ramp waveform voltage. Thus, an erase ramp waveform voltage that is a second inclined waveform voltage increasing from 0 (V) that is the base potential toward voltage Vers is generated. Then, while this erase ramp waveform voltage increases, the voltage difference between scan electrode SCi and sustain electrode SUi exceeds the discharge start voltage. At this time, in this exemplary embodiment, each numerical value is set so that discharge is generated only between scan electrode SCi and sustain electrode SUi. For example, sustain pulse voltage Vs is set to about 210 (V), voltage Vers is set to about 213 (V), and the gradient of the erase ramp waveform voltage is set to about 10 V/μsec. Thus, feeble discharge can be generated between scan electrode SCi and sustain electrode SUi, and this feeble discharge can be continued while the erase ramp waveform voltage increases.

At this time, if momentary strong discharge due to a rapid voltage change is generated, a large amount of charged particles generated by the strong discharge form large wall charge in order to release the rapid change of the voltage, thus excessively erasing the wall voltage formed by immediately preceding sustain discharge. Furthermore, in a panel having a larger screen, a higher resolution and an increased drive impedance, waveform distortion such as ringing tends to occur in a drive waveform generated by the drive circuit. Therefore, in the drive waveform for causing narrow width erase discharge mentioned above, strong discharge by the waveform distortion may occur.

However, this exemplary embodiment has a configuration in which feeble erase discharge is continuously generated between scan electrode SCi and sustain electrode SUi by an erase ramp waveform voltage that gradually increases the applied voltage. Therefore, even in a panel having a larger screen, a higher resolution and an increased drive impedance, erase discharge can be generated stably. The wall voltages on scan electrode SCi and on sustain electrode SUi can be adjusted to a state suitable for stably causing a subsequent address.

Although not shown in the drawing, at this time, since data electrodes D1-Dm are sustained to 0 (V), a positive wall voltage is formed on data electrodes D1-Dm.

(Period T9)

At time t9, when a drive waveform voltage output from initializing waveform generating circuit 53 reaches voltage Vers, switching element Q16 is turned on, an electric current input into input terminal INc in order to operate second Miller integrating circuit 56 is pulled out by switching element Q16 and second Miller integrating circuit 56 stops its operation.

As mentioned above, after a voltage applied to scan electrodes SC1-SCn reaches voltage Vers, when the voltage is sustained, abnormal discharge that induces error discharge in the subsequent address period may occur. However, this exemplary embodiment can prevent this abnormal discharge because it has a configuration in which immediately after the voltage applied to scan electrodes SC1-SCn reaches voltage Vers, it is reduced to 0 (V) that is the base potential.

Then, after time t10 that is an initializing period of the subsequent subfield, an initializing operation in the subsequent subfield starts. For example, if the subsequent subfield is a selective initializing subfield, a selective initializing operation starts by applying a down ramp waveform voltage to scan electrodes SC1-SCn and voltage Ve1 to the sustain electrode.

Figure 8:
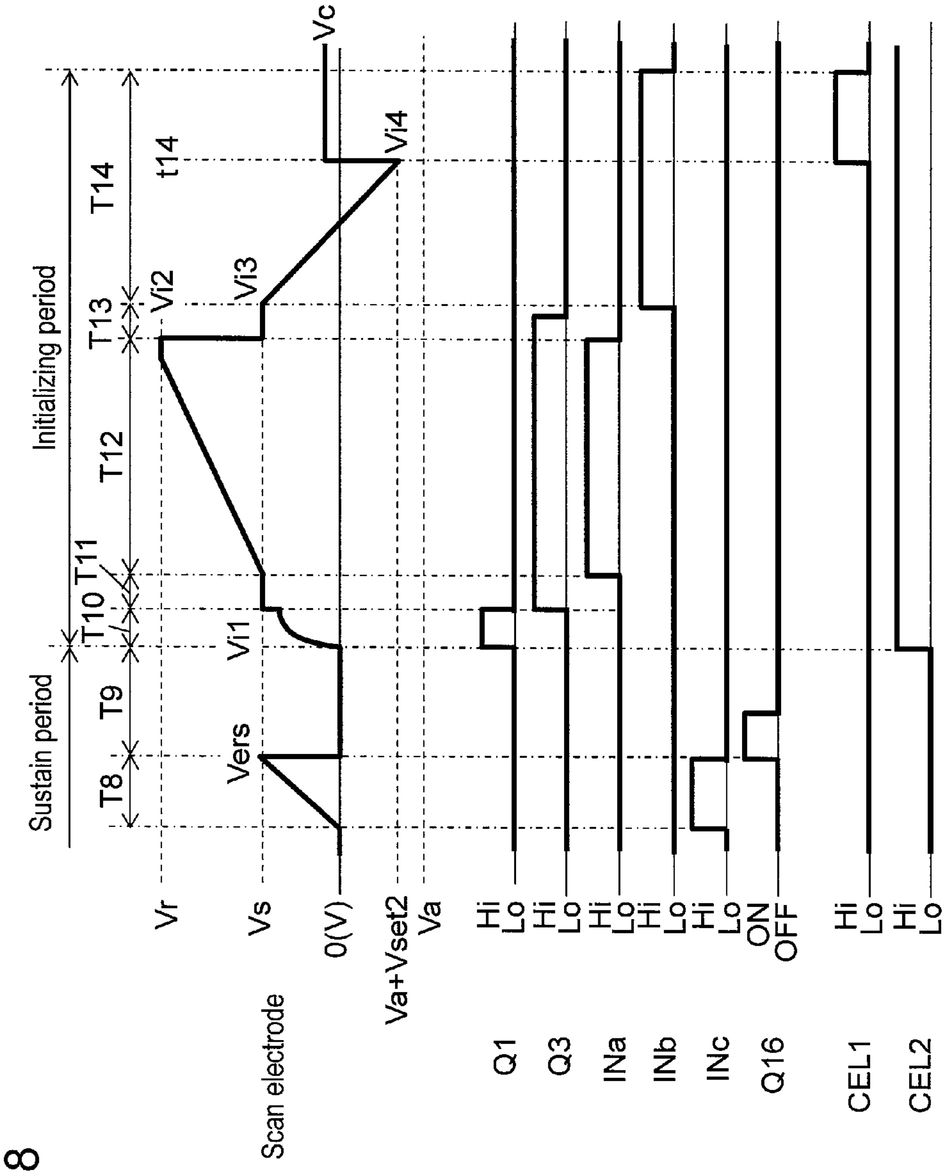
FIG. 8 is a timing chart to illustrate one example of an operation of the scan electrode drive circuit in an all-cell initializing period in accordance with the first exemplary embodiment of the present invention.

Next, the detail of a drive waveform voltage in the initializing period is described. FIG. 8 is a timing chart to illustrate one example of an operation of scan electrode drive circuit 43 in an all-cell initializing period in accordance with the first exemplary embodiment of the present invention. In FIG. 8, a drive waveform in an all-cell initializing operation is described as an example. However, also in the selective initializing operation, a down ramp waveform voltage can be generated by the same control.

Furthermore, in FIG. 8, a drive waveform voltage carrying out an all-cell initializing operation is divided into five periods denoted by periods T10 to T14, and each period is described. Furthermore, in the description, voltage Vi1 and voltage Vi3 are assumed to be equal to voltage Vs, voltage Vi2 is assumed to be equal to voltage Vr, and voltage Vi4 is assumed to be equal to voltage (Va+Vset2) obtained by superimposing voltage Vset2 to voltage Va. Furthermore, in the drawing, as to the input signals CELL and CEL2 to AND gate AG, similarly, “1” is denoted by “Hi,” and “0” is denoted by “Lo.”

Furthermore, in order to show the difference between the generation of an erase ramp waveform voltage and the generation of an up ramp waveform voltage, FIG. 8 shows operations in periods T8 to T9 during which an erase ramp waveform voltage is generated.

Herein, in order to make voltage Vi4 be voltage (Va+Vset2) obtained by superimposing voltage Vset2 to negative voltage Va, switching signal CEL2 is sustained to be “1” in periods T10 to T14. Furthermore, although not shown, in periods T10 to T14, switching element Q21 is sustained to be off. Furthermore, although not shown, a signal with polarity reversed with respect to a signal input into input terminal INa is input into switching element Q12 constituting an isolating circuit. A signal with polarity reversed with respect to a signal input into input terminal INb is input into switching element Q13 constituting an isolating circuit.

(Period T8)

In period T8, input terminal INc is set to “Hi.” Thus, a constant electric current flows from resistor R12 to capacitor C11, a source voltage of switching element Q15 increases in a ramp shape, and an output voltage of scan electrode drive circuit 43 starts to increase in a ramp shape with a steeper gradient as compared with the up ramp waveform voltage.

(Period T9)

When a drive waveform voltage output from initializing waveform generating circuit 53 reaches voltage Vers, switching element Q16 is turned on and an electric current input into input terminal INc for operating second Miller integrating circuit 56 is pulled out by switching element Q16, so that second Miller integrating circuit 56 stops its operation.

Thus, an erase ramp waveform voltage that is a second inclined waveform voltage increasing from 0 (V) that is the base potential toward voltage Vers is generated.

(Period T10)

Then, switching element Q1 of sustain pulse generating circuit 50 is turned on. Then, interelectrode capacitance Cp and inductor L1 resonate with each other. A voltage of scan electrodes SC1-SCn starts to increase from power recovery capacitor C1 via switching element Q1, diode D1, and inductor L1.

(Period T11)

Next, switching element Q3 of sustain pulse generating circuit 50 is turned on. Then, voltage Vs is applied to scan electrodes SC1-SCn via switching elements Q3 and Q12, and the potential of scan electrodes SC1-SCn becomes voltage Vs (which is equal to voltage Vi1 in this exemplary embodiment).

(Period T12)

Next, input terminal INa of the Miller integrating circuit that generates an up ramp waveform voltage is made to be "Hi." Specifically, for example, a voltage of 15 (V) is applied to input terminal INa. Then, a constant electric current flows from resistor R10 toward capacitor C10 and a source voltage of switching element Q11 increases in a ramp shape and an output voltage of scan electrode drive circuit 43 starts to increase in a ramp shape. This voltage increase continues while input terminal INa is "Hi."

When this output voltage is increased to voltage Vr (which is equal to Vi2 in this exemplary embodiment), then input terminal INa is set to "Lo." Specifically, for example, a voltage of 0 (V) is applied to input terminal INa.

In this way, an up ramp waveform voltage gently increasing from voltage Vs (which is equal to Vi1 in this exemplary embodiment) that is not more than the discharge start voltage toward voltage Vr (which is equal to Vi2 in this exemplary embodiment) that is more than the discharge start voltage is applied to scan electrodes SC1-SCn.

(Period T13)

When input terminal INa is made to be "Lo," the voltage of scan electrodes SC1-SCn is reduced to voltage Vs (which is equal to voltage Vi3 in this exemplary embodiment). Thereafter, switching element Q3 is turned off.

(Period T14)

Next, input terminal INb of the Miller integrating circuit that generates a down ramp waveform voltage is made to be "Hi." Specifically, for example, a voltage of 15 (V) is applied to input terminal INb. Then, a constant electric current flows from resistor R11 toward capacitor C12, and a drain voltage of switching element Q14 decreases in a ramp shape, and an output voltage of scan electrode drive circuit 43 starts to decrease in a ramp shape. Then, immediately before the initializing period is finished, input terminal INb is set to "Lo." Specifically, for example, a voltage of 0 (V) is applied to input terminal INb.

Note here that in period T14, switching element Q13 is turned off. However, the Miller integrating circuit that generates a down ramp waveform voltage can reduce the output voltage of scan electrode drive circuit 43 via a body diode of switching element Q13.

Furthermore, comparator CP compares this down ramp waveform voltage with voltage (Va+Vset2) obtained by adding voltage Vset2 to voltage Va. The output signal from comparator CP is changed from "0" to "1" at time t14 when the down ramp waveform voltage becomes not more than voltage (Va+Vset2). Since switching signal CEL2 is "1," an input from AND gate AG is "1" and "1" is output from AND gate AG, and voltage Vc obtained by superimposing voltage Vscn to negative voltage Va is output from scan pulse generating circuit 54. Therefore, a down ramp waveform voltage in which voltage Vi4 is set to voltage (Va+Vset2) is output from scan pulse generating circuit 54.

As mentioned above, scan electrode drive circuit 43 generates an up ramp waveform voltage that is the first inclined waveform voltage gently increasing from voltage Vi1 that is not more than the discharge start voltage toward voltage Vi2 that is more than the discharge start voltage, and applies it to scan electrodes SC1-SCn. Thereafter, scan electrode drive circuit 43 applies the down ramp waveform voltage, gently decreasing from voltage Vi3 toward voltage Vi4, to scan electrodes SC1-SCn.

Although not shown, after the initializing period is finished, in the subsequent address period, switching element Q21 is sustained to be on. Thus, a voltage input into one terminal of comparator CP is negative voltage Va, and output signal CELL from comparator CP is sustained to be "1." Thus, the output from AND gate AG is sustained to be "1," and voltage Vc, which is obtained by superimposing voltage Vscn to negative voltage Va, is output from scan pulse generating circuit 54. Then, when switching signal CEL2 is made to be "0" at a timing of generating a negative scan pulse voltage, the output signal of AND gate AG is made to be "0" and negative voltage Va is output from scan pulse generating circuit 54. Thus, a negative scan pulse voltage in the address period can be generated.

As described above, in this exemplary embodiment, at the end of the sustain period, that is, after a sustain pulse is applied to the display electrode pair, the erase ramp waveform voltage whose gradient is made to be steeper than the up ramp waveform voltage is applied to scan electrodes SC1-SCn so as to cause feeble erase discharge continuously. Then, immediately after the increasing erase ramp waveform voltage reaches voltage Vers, it is reduced to 0 (V) that is the base potential. As a result, even in a panel having a larger screen and a higher resolution, address discharge can be generated stably without increasing the voltage necessary to cause address discharge, the quality of image display can be improved.

Figure 9:
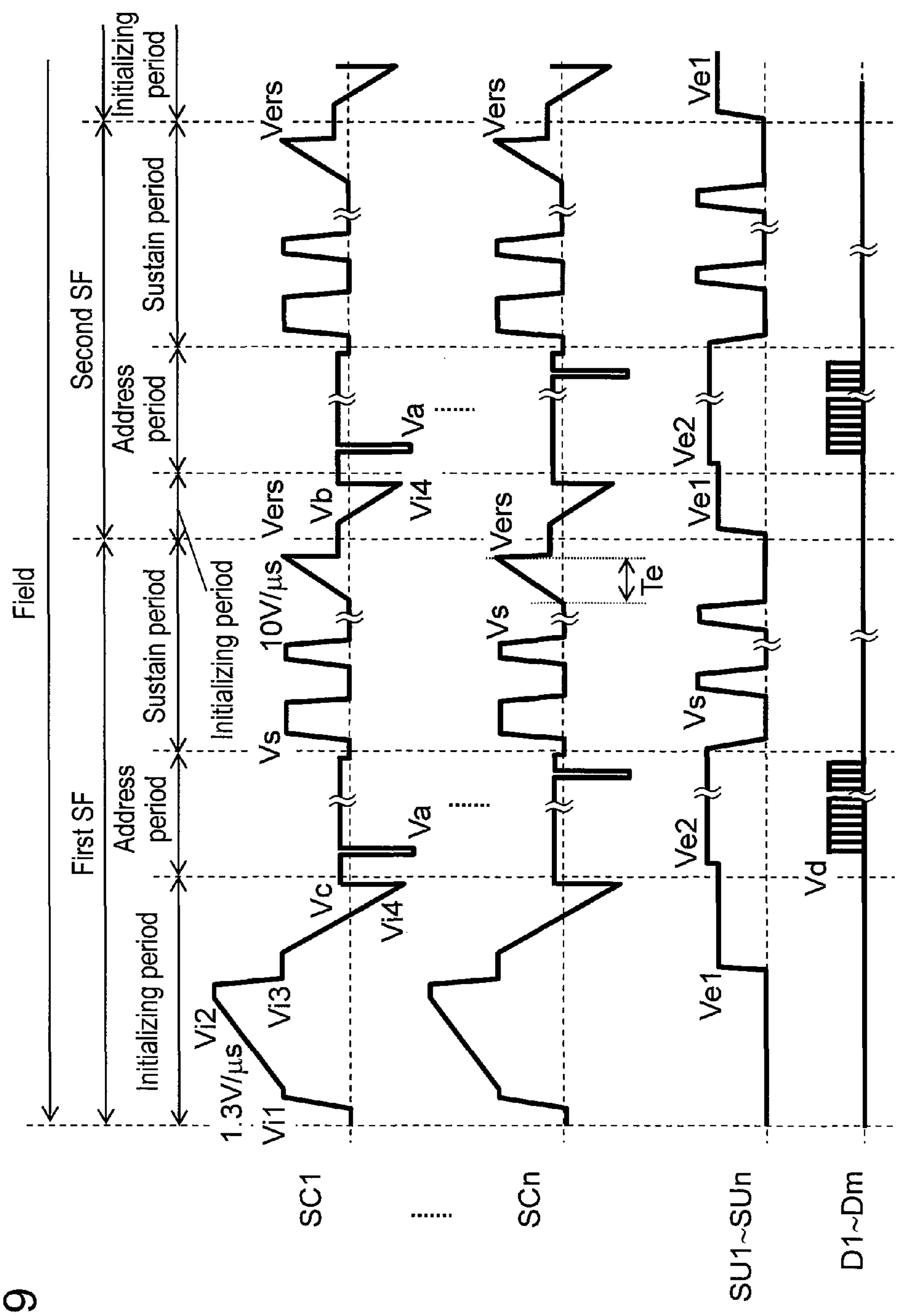
FIG. 9 shows another example of drive waveform voltages in accordance with the first exemplary embodiment of the present invention.

Note here that this exemplary embodiment describes a configuration in which the erase ramp waveform voltage is reduced to 0 (V) that is the base potential immediately after the increasing voltage reaches voltage Vers. However, in order to prevent the above-mentioned abnormal discharge, it is desirable that a reducing endpoint potential is set to not more than 70% of voltage Vers. FIG. 9 shows another example of a drive waveform voltage in accordance with the first exemplary embodiment of the present invention. For example, FIG. 9 shows a configuration in which immediately after the erase ramp waveform voltage reaches voltage Vers, it is reduced to voltage Vb (voltage Vb is a voltage of not more than "Vers×0.7"). Thus, even if voltage Vb is sustained for a predetermined period, the above-mentioned effect can be obtained while the above-mentioned abnormal discharge is prevented. Furthermore, in this exemplary embodiment, the lower limit voltage value of the reducing endpoint potential is set to 0 (V) that is the base potential. This lower limit value is just a value that is set in order to carry out selective initializing operation smoothly in the subsequent down ramp waveform voltage. In this exemplary embodiment, this lower limit voltage value is not limited to the above-mentioned value and it may be suitably set to the range in which an operation following the erasing operation can be carried out smoothly.

Note here that this exemplary embodiment describes a configuration in which an erase ramp waveform voltage is generated at the end of the sustain period and is applied to scan electrodes SC1-SCn. However, by devising the shape of the waveform of the sustain pulse immediately before the erase ramp waveform voltage, erase discharge by the erase ramp waveform voltage can be stably generated. In the following second exemplary embodiment, an example of this drive waveform is described.

(Second Exemplary Embodiment)

Figure 10:
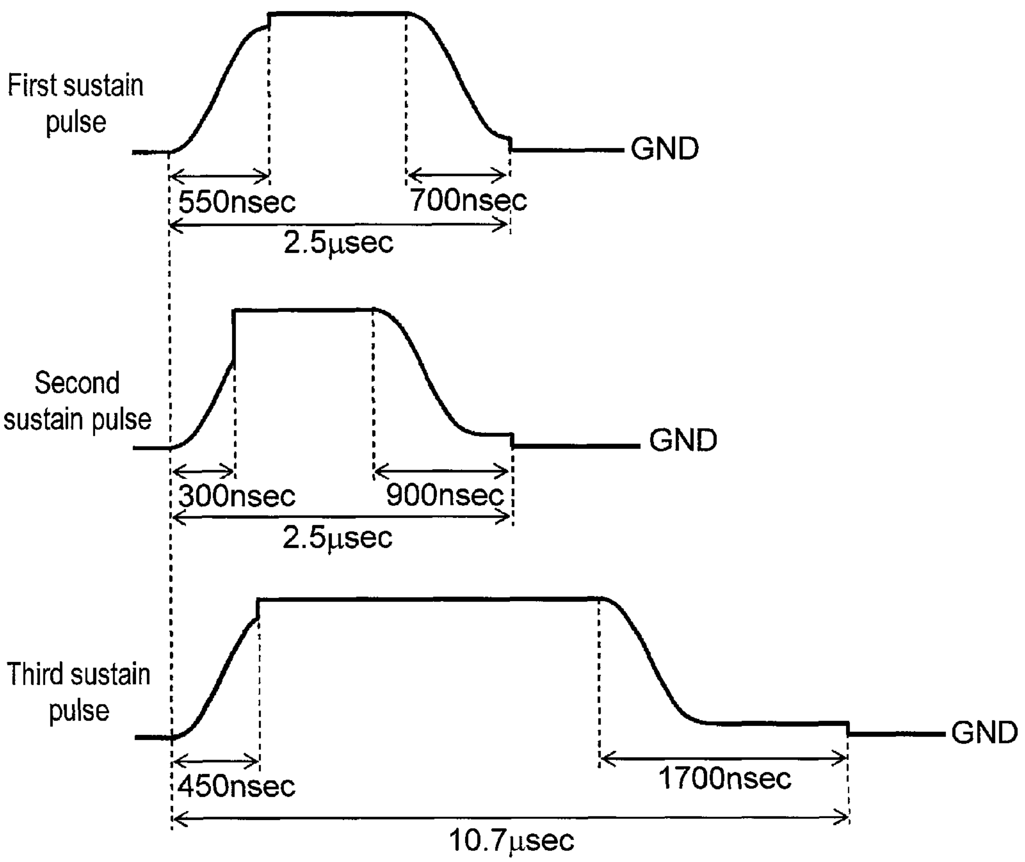
FIG. 10 is a waveform diagram schematically showing sustain pulses waveforms in accordance with a second exemplary embodiment of the present invention.

FIG. 10 is a waveform diagram schematically showing waveforms of sustain pulses in accordance with a second exemplary embodiment of the present invention. The second exemplary embodiment describes a configuration in which three kinds of sustain pulses having different kinds of waveform shapes are switched from each other to be generated. Then, each sustain pulse is generated by controlling the timing of changing between switching elements in sustain pulse generating circuit 50 and sustain pulse generating circuit 60, thereby controlling the driving time of each power recovery circuit and each voltage clamping circuit. That is to say, sustain pulse generating circuit 50 and sustain pulse generating circuit 60 are sustain pulse generating circuits for alternately applying to display electrode pair 24 and are drive circuits for driving panel 10. Therefore, since the other operations and configurations of the circuits, and the like, are the same as those in the first exemplary embodiment, the different points are described herein. In FIG. 10, a ground potential is denoted by "GND."

As shown in FIG. 10, in this exemplary embodiment, in the sustain period, three kinds of sustain pulses having different shapes of waveform are switched from each other so as to be generated. That is to say, the three kinds of sustain pulses include a first sustain pulse as a reference pulse, a second sustain pulse, and a third sustain pulse. Herein, the second sustain pulse rises more steeply than the first sustain pulse and falls more gently than the first sustain pulse. Furthermore, the third sustain pulse falls further gently than the second sustain pulse and has a longer pulse width than the first sustain pulse. Note here that the pulse width is a time period from the time the sustain pulse starts to rise to the time the sustain pulse finishes falling.

Specifically, the first sustain pulse that is a reference sustain pulse has the pulse width of about 2.5 μsec, the rising period of about 550 nsec, and the falling period of about 700 nsec.

Furthermore, the second sustain pulse has the rising period of about 300 nsec, which is shorter than that of the first sustain pulse, and rises more steeply than the first sustain pulse. Furthermore, the second sustain pulse has the falling period of about 900 nsec, which is longer than the first sustain pulse and falls more gently than the first sustain pulse. Then, the second sustain pulse is generated so that its pulse width is set to be about 2.5 μsec that is equal to that of the first sustain pulse.

Furthermore, the third sustain pulse has the rising period of about 450 nsec, which is slightly shorter than that of the first sustain pulse. Furthermore, the third sustain pulse has the falling period of about 1700 nsec, which is further longer than that of the second sustain pulse and falls more gently than the second sustain pulse. Then, the third sustain pulse is generated so that the pulse width is set to be about 10.7 μsec, which is longer than that of the first sustain pulse. At this time, in the third sustain pulse, the period in which a voltage is clamped to voltage Vs is made to be longer than that of the first sustain pulse, thereby widening the pulse width.

Note here that the resonance cycle of LC resonance between inductor L1 of power recovery circuit 51 and interelectrode capacitance Cp of panel 10, and the resonance cycle of LC resonance between inductor L30 of power recovery circuit 61 and interelectrode capacitance Cp can be calculated from formula: "$2\pi(LCp)^{1/2}$". Herein, the inductances of inductor L1 and inductor L30 are denoted by L, respectively. Then, in this exemplary embodiment, inductor L1 and inductor L30 are set so that the resonance cycles of power recovery circuit 51 and power recovery circuit 61 are about 1500 nsec. Then, the first sustain pulse is set so that the falling period becomes a time that is ½ or less of this resonance cycle. Furthermore, the second sustain pulse is set so that the falling period becomes a time that is not less than 1.1 times of the half of this resonance cycle and less than the resonance cycle. The third sustain pulse is set so that the falling period becomes not less than the time of this resonance cycle.

Furthermore, in the falling of the second sustain pulse and the third sustain pulse, by the action of back-flow preventing diode D2 and diode D32, a voltage dose not increase even after the time of ½ of the resonance cycle has passed, and the lowest voltage value is sustained.

Figure 11A:
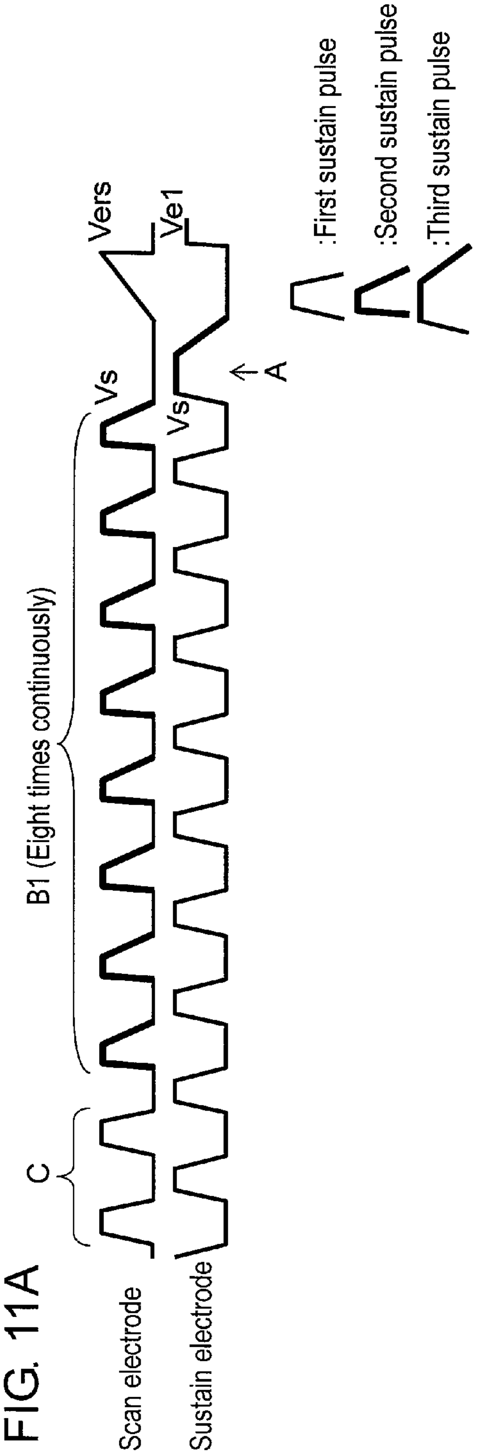
FIG. 11A is a schematic view showing a state of sustain pulses generated immediately before an erase ramp waveform voltage in accordance with the second exemplary embodiment of the present invention, showing a case where the total number of the sustain pulses in the sustain period is not less than 50.
Figure 11B:
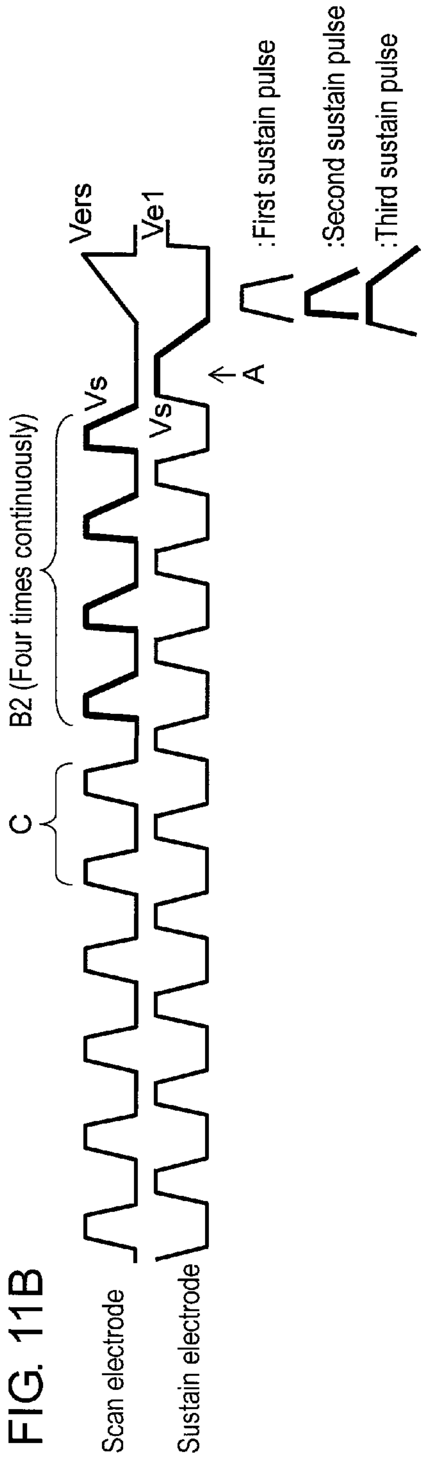
FIG. 11B is a schematic view showing a state of sustain pulses generated immediately before an erase ramp waveform voltage in accordance with the second exemplary embodiment of the present invention, showing a case where the total number of the sustain pulses in the sustain period is less than 50.

FIGS. 11A and 11B are schematic views showing a state of a sustain pulse generated immediately before an erase ramp waveform voltage in accordance with the second exemplary embodiment of the present invention. In this exemplary embodiment, in the sustain period, the first sustain pulse, the second sustain pulse and the third sustain pulse are switched from each other and applied to display electrode pair 24. Furthermore, the second sustain pulse is continuously generated, and the number of generation is changed in accordance with the total number of sustain pulses in the sustain period (total number excluding the erase ramp waveform). FIG. 11A shows the case where the total number of sustain pulses in the sustain period is not less than 50, and FIG. 11B shows the case where the total number of sustain pulses in the sustain period is less than 50. Note here that this "total number of sustain pulses" is not a total number of sustain pulses in one field but the total number of sustain pulses in each subfield within the sustain period. Hereinafter, the "total number of sustain pulses" (total number excluding the number of erase ramp waveform) refers to the total number of sustain pulses for every subfield.

Specifically, as shown in FIGS. 11A and 11B, immediately before the erase ramp waveform voltage is generated (A in the drawings), a third sustain pulse is generated and applied to sustain electrodes SU1-SUn.

Furthermore, immediately before a third sustain pulse (B1 and B2 in the drawings), a second sustain pulse is applied to an electrode at the side in which an erase ramp waveform voltage is applied, herein, to scan electrodes SC1-SCn, continuously at predetermined times according to the total number of sustain pulses. In this exemplary embodiment, in the sustain period in which the total number of the sustain pulses is not less than 50, the second sustain pulse is continuously generated eight times as the predetermined time as shown in FIG. 11A. Furthermore, in the sustain period in which the total number of the sustain pulses is less than 50, the second sustain pulse is continuously generated and applied to scan electrodes SC1-SCn four times as a predetermined times as shown in FIG. 11B.

In this exemplary embodiment, with such a configuration, erase discharge can be stably generated, and furthermore, the subsequent address discharge can be generated stably, for the following reasons.

In the erasing operation, by applying an erase ramp waveform voltage to scan electrodes SC1-SCn, erase discharge is generated between scan electrode SCi and sustain electrode SUi. Therefore, it is necessary to form sufficient wall charge in the immediately preceding sustain discharge. If the wall charge is not sufficient, erase discharge cannot be generated stably.

In order to allow wall charge to accumulate sufficiently, it is effective to cause sustain discharge strongly and to increase the clamping period to voltage Vs so as to widen the pulse width of the sustain pulse.

Then, this exemplary embodiment has a configuration in which a third sustain pulse is generated immediately before the erase ramp waveform voltage (A in the drawing) and is applied to sustain electrodes SU1-SUn. Thus, when the driving time of power recovery circuit 51 is shortened so as to make the rising steep, sustain discharge is strongly generated, thus enabling sufficient charged particles to be generated. Furthermore, by increasing the clamping time to voltage Vs so as to widen the pulse width of the sustain pulse, the generated charged particles can be sufficiently accumulated as wall charge. Thus, sufficient wall charge can accumulate immediately before the erase discharge, and the erase discharge can be generated stably.

Furthermore, in the sustain operation, when discharge is generated in a state in which the change of voltage is steep, strong discharge is generated, thus enabling sufficient wall charge to be formed in a discharge cell. Furthermore, by causing discharge in a state in which the change of voltage is steep, a variation of the discharge start voltage can be absorbed and variation for every discharge cell can be suppressed in the sustain discharge. As a result, wall charge can be uniformly formed.

In particular, in erase discharge generated by applying an erase ramp waveform voltage to scan electrodes SC1-SCn, it is important to form a sufficient positive wall voltage on scan electrode SCi by the time erase discharge is generated. Then, it is experimentally confirmed that by continuously applying a steeply rising sustain pulse to the electrode at the side to which an erase ramp waveform is applied, herein, applying to scan electrodes SC1-SCn before erase discharge, erase discharge can be generated further stably.

This exemplary embodiment has a configuration in which immediately before an erase ramp waveform voltage that is the last drive waveform voltage in the sustain period (B1 or B2 in the drawings), a second sustain pulse is applied to an electrode at the side to which the erase ramp waveform voltage is applied, herein, applied to scan electrodes SC1-SCn, continuously at predetermined times according to the total number of sustain pulses in the sustain period. With this configuration, strong sustain discharge can be generated before erase discharge so as to allow sufficient wall charge to accumulate with a variation suppressed, thus causing erase discharge further stably.

It is also confirmed that when the number of continuously applying the steeply rising sustain pulses is increased, reactive power (electric power consumed ineffectively without contributing light emission) is increased. It is desirable that this number of continuously applying the steeply rising sustain pulses is set to be in the range in which the above-mentioned effect can be obtained sufficiently without increasing the reactive power. In this exemplary embodiment, the number is desirable that it is set to not less than two and not more than 20. Furthermore, it is desirable that the number is set according to the total number of the sustain pulses in the sustain period. Then, in this exemplary embodiment, in the sustain period in which the total number of the sustain pulses is not less than 50, the second sustain pulse is generated eight times continuously (B1 in the drawing), and in the sustain period in which the total number of the sustain pulses is less than 50, the second sustain pulse is generated four times continuously (B2 in the drawing). This is because it is experimentally confirmed that in the sustain period in which the total number of sustain pulses is relatively small, an effect of reducing the after-image phenomenon can be obtained by reducing the number of continuously applying the second sustain pulse. Herein, the after-image phenomenon is a phenomenon in which when an image with a high brightness is displayed after a still image and the like is displayed for a long time, the still image is recognized as an after-image.

On the other hand, in the sustain operation, it is confirmed that when strong discharge is generated in the rising of the sustain pulse, feeble discharge may be generated in the falling of the sustain pulse. Since this discharge reduces wall charge formed by the sustain discharge, when the discharge by this falling is generated immediately before the erase discharge, wall charge may be insufficient, thus causing erase discharge unstably, which is not preferable. Furthermore, when feeble discharge is generated in the falling at the time the second sustain pulse is applied, subsequent sustain discharge may be unstable, which is not preferable.

Then, it is experimentally confirmed that by increasing the time for falling, specifically, by making the time to be not less than 1.1 times of the half of the resonance cycle, this feeble discharge in the falling can be reduced.

Then, in this exemplary embodiment, the second sustain pulse rising more steeply than the first sustain pulse is made to fall more gently than the first sustain pulse. Therefore, the driving time of power recovery circuit 51 in the falling of the sustain pulse is set to not less than 1.1 times of the half of the resonance cycle, which is longer than the first sustain pulse. Note here that in this exemplary embodiment, the time that is not less than 1.1 times of the half of the resonance cycle is, specifically, about 900 nsec. Thus, in the sustain operation by a steeply rising sustain pulse, feeble discharge that may be generated in the falling of the sustain pulse can be prevented, causing the subsequent sustain discharge stably. Therefore, erase discharge can be generated more stably.

Furthermore, it is confirmed that when the time for falling is made to be not less than the resonance cycle, this feeble discharge in the falling can be further reduced.

In this exemplary embodiment, a third sustain pulse generated immediately before the erase ramp waveform voltage (A in the drawing) is allowed to fall over the time of not less than the resonance cycle. In this exemplary embodiment, the time of not less than the resonance cycle is specifically about 1700 nsec. Thus, it is possible to reduce the generation of feeble discharge due to falling of sustain pulse immediately before the erase discharge, and to generate erase discharge stably.

Furthermore, as shown in FIGS. 11A and 11B, this exemplary embodiment has a configuration in which immediately before the second sustain pulse is continuously generated (C in the drawing), a first sustain pulse as a reference is applied to the electrode at the side to which an erase ramp waveform voltage is applied (herein, scan electrodes SC1-SCn) at least twice continuously.

When strong sustain discharge is continuously generated, in the discharge cell having a difference in timing at which discharge is generated between adjacent discharge cells, wall charge may be reduced by the effect of the strong sustain discharge occurring in the adjacent discharge cells. Alternatively, in a portion where the discharge cell in which sustain discharge is generated and the discharge cell in which sustain discharge is not generated are adjacent to each other, even in a discharge cell causing sustain discharge later or in a discharge cell that does not cause sustain discharge, due to the effect of the strong sustain discharge occurring in the adjacent discharge cells, wall charges are reduced. These are so-called charge drop off.

Then, it is experimentally confirmed that the first sustain pulse rising more gently than the second sustain pulse is applied not less than twice continuously to the electrode at the side to which the second sustain pulse is applied (herein, scan electrodes SC1-SCn) immediately before the second sustain pulse is continuously generated (C in the drawing), the above-mentioned charge drop off can be prevented. Then, this exemplary embodiment has a configuration in which immediately before the second sustain pulse is continuously generated, the first sustain pulse is applied to the electrode at the side to which an erase ramp waveform voltage is applied (herein, scan electrodes SC1-SCn) at least twice. Thus, it is possible to prevent charge drop off, to cause sustain discharge by a second sustain pulse stably, and to cause erase discharge more stably.

As described above, according to this exemplary embodiment, since sufficient wall charge can be formed immediately before the erase ramp waveform voltage is generated, erase discharge can be generated stably. Furthermore, according to this exemplary embodiment, even in a panel having a larger screen and a higher resolution, address discharge can be generated stably and the quality of image display can be improved.

In this exemplary embodiment, the lower limit value of the time for falling of the second sustain pulse is set to be 1.1 times of the half of the resonance cycle. However, since the wall charge formed by the sustain discharge are gradually reduced over time, when the upper limit value is made to be too large, the subsequent sustain discharge may not be generated stably. In this exemplary embodiment, the upper limit value of the time for falling of the second sustain pulse is set to be the resonance cycle, and when the second sustain pulse is generated, the second sustain pulse is allowed to fall over time of not less than 1.1 times of the half of the resonance cycle of the interelectrode capacitance and the inductor and less than the resonance cycle.

Furthermore, this exemplary embodiment describes a configuration in which the second sustain pulse is generated eight times continuously in the sustain period in which the total number of the sustain pulses is not less than 50, and the second sustain pulse is generated four times continuously in the sustain period in which the total number of the sustain pulses is less than 50. However, this is just one example, and, for example, the threshold value of the total number of sustain pulses for switching the number of continuous generation of the second sustain pulse may be changed to the other values. For example, the number of continuous generation of the second sustain pulse may be changed between the total number of not less than 30 and the total number of less than 30. Alternatively, the number of continuous generation of the second sustain pulse may be changed to the other values, for example, six and ten. Alternatively, the number of continuous generation of the second sustain pulses may be changed at not less than three values, for example, the number of continuous generation of the second sustain pulses may be changed, for example, four times, six times and eight times. These specific values may be optimized according to specifications of the plasma display devices, characteristics of the panel, or the like.

As mentioned above, this exemplary embodiment is characterized in that a drive circuit applies a first inclined waveform voltage, a second inclined waveform voltage and a second sustain pulse to scan electrodes SC1-SCn. Furthermore, the drive circuit generates a gently rising first inclined waveform voltage in the initializing period of at least one subfield in one field period. Furthermore, the drive circuit generates a second inclined waveform voltage that has a steeper gradient than the first inclined waveform voltage and that is reduced immediately after the rising waveform voltage reaches a predetermined potential at the end of the sustain period. Then, the drive circuit continuously applies a second sustain pulse of the predetermined number immediately before the second inclined waveform voltage in the sustain period.

Note here that this exemplary embodiment describes a configuration in which the number of continuously generating the second sustain pulse is changed according to the total number of the sustain pulses in the sustain period. However, the number may be changed according to the lighting rate. In the following third exemplary embodiment, an example of this drive waveform is described.

(Third Exemplary Embodiment)

Figure 12:
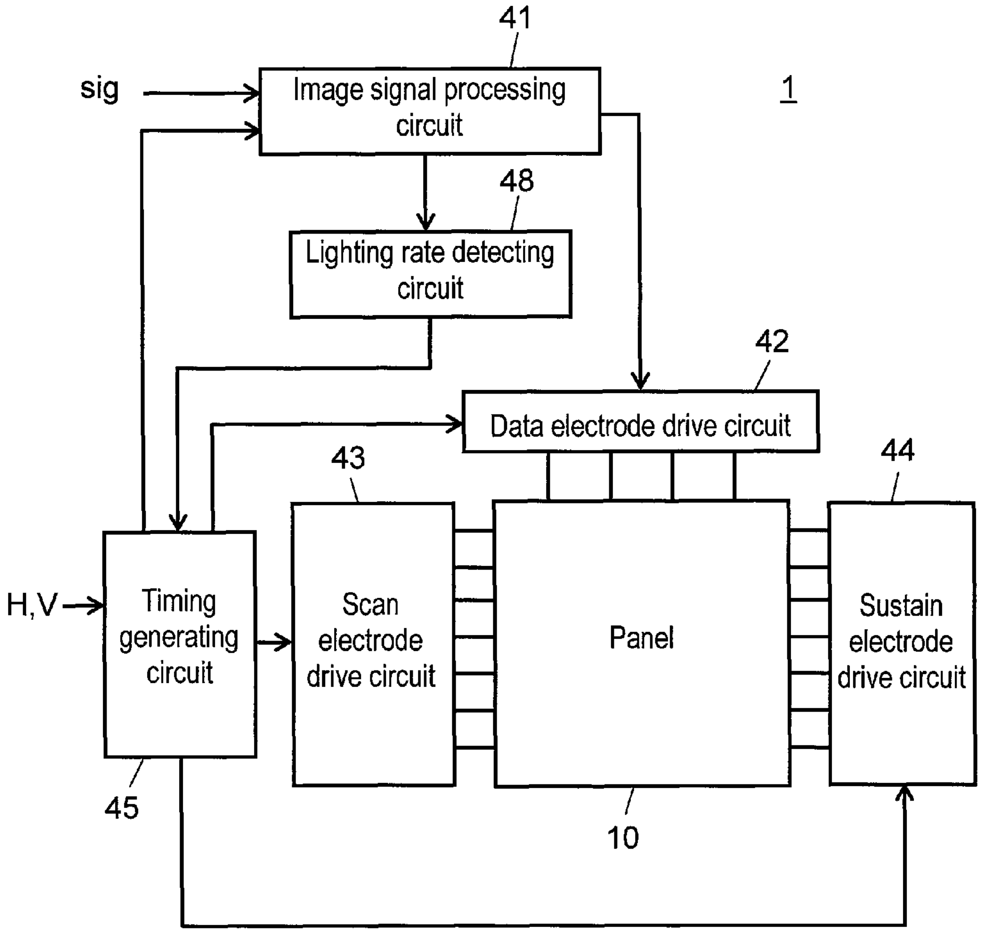
FIG. 12 is a circuit block diagram showing a plasma display device in accordance with a third exemplary embodiment of the present invention.

FIG. 12 is a circuit block diagram showing a plasma display device in accordance with a third exemplary embodiment of the present invention. Plasma display device 1 in this exemplary embodiment has a configuration in which lighting rate detecting circuit 48 is added to the plasma display device shown in FIG. 4 in accordance with the first exemplary embodiment. This exemplary embodiment has a configuration in which the number of continuously generating the second sustain pulse is changed on the basis of the detection results of lighting rate detecting circuit 48. Since other operations and a configuration of each circuit, and the like, are the same as those in the first exemplary embodiment, different points are described herein.

Lighting rate detecting circuit 48 detects the rate of the number of lighting discharge cells with respect to the number of all discharge cells, that is, the lighting rate of discharge cell, on the basis of the image data for every subfield. Then, the detected lighting rate is compared with the preliminarily determined lighting rate threshold value, and outputs a signal representing the results of the determination to timing generating circuit 45.

In this exemplary embodiment, this lighting rate threshold value is set to 85%. However, in this exemplary embodiment, the lighting rate threshold value is not particularly limited to this value and desirably optimized according to characteristics of the panel, specifications of the plasma display devices, or the like.

Figure 13A:
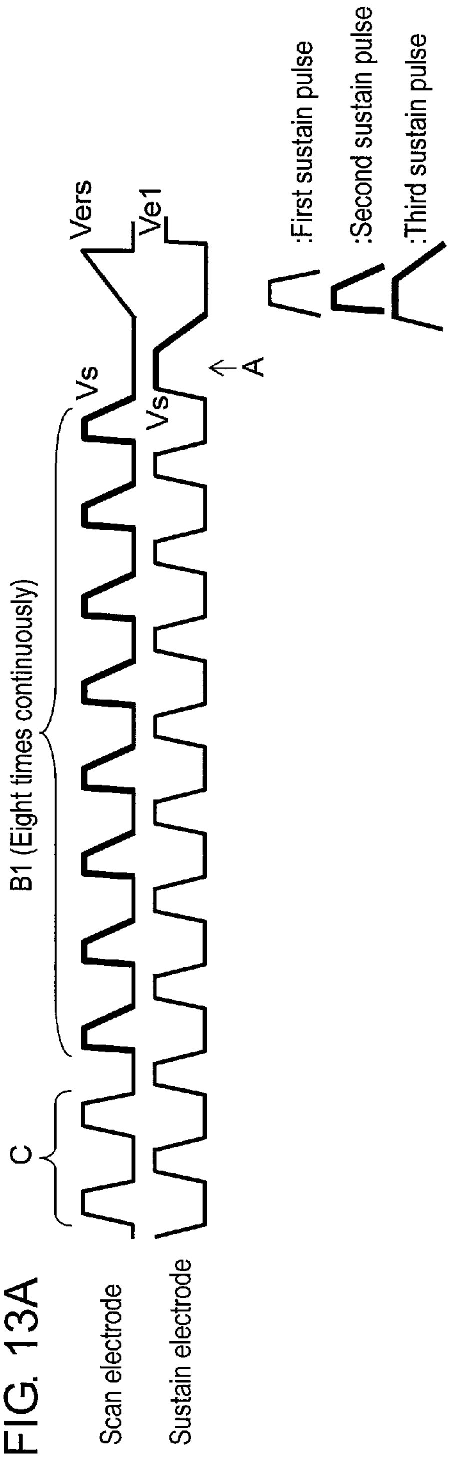
FIG. 13A is a schematic waveform view schematically showing sustain pulse waveforms in accordance with the third exemplary embodiment of the present invention, showing a case where the lighting rate is not less than 85%.
Figure 13B:
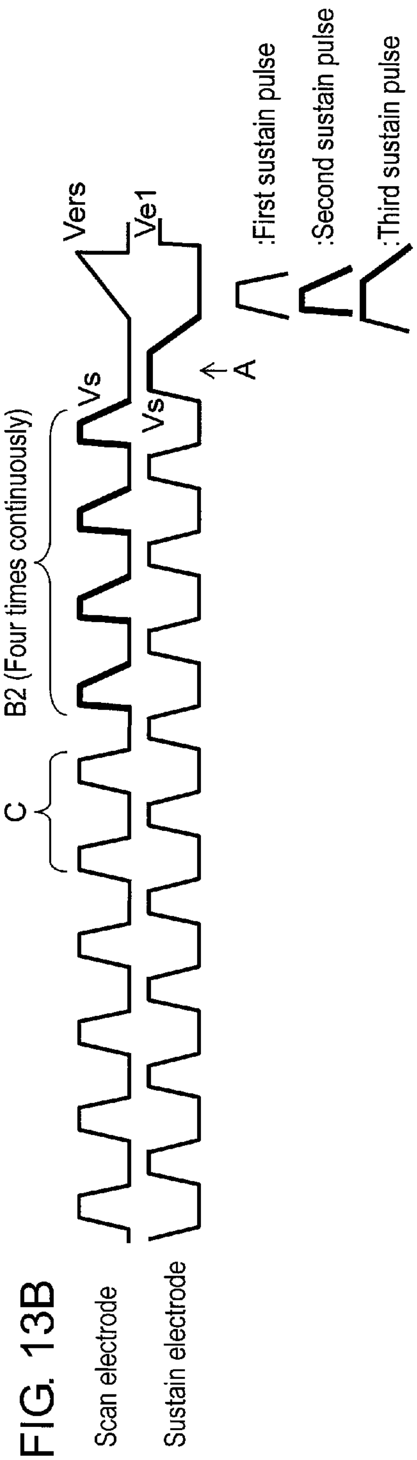
FIG. 13B is a schematic waveform view schematically showing sustain pulse waveforms in accordance with the third exemplary embodiment of the present invention, showing a case where the lighting rate is less than 85%.

FIGS. 13A and 13B are waveforms each schematically showing a sustain pulse waveform in accordance with the third exemplary embodiment of the present invention. In this exemplary embodiment, in the sustain period in which the lighting rate is not less than 85%, the second sustain pulse is generated eight times continuously and applied to scan electrodes SC1-SCn as shown in B1 of FIG. 13A; and in the sustain period in which the lighting rate is less than 85%, the second sustain pulse is generated four times continuously and applied to scan electrodes SC1-SCn as shown in B2 of FIG. 13B. Note here that reference marks A and C in the drawings are the same as those in FIGS. 11A and 11B.

In this exemplary embodiment, with such a configuration, erase discharge can be generated stably and subsequent address discharge can be generated more stably for the following reasons.

Driving load of panel 10 seen from the drive circuit changes according to the combination of light emission/non-light emission of the discharge cell. At this time, when the lighting rate of the discharge cell is high, the driving load is increased. As a result, distortion in the drive waveform tends to be distorted. Thus, for example, in the sustain operation, variation in the sustain discharge may be generated for every discharge cell.

At this time, when discharge is generated in a state in which a voltage changes steeply, since it is possible to absorb the variation of the discharge start voltage and to suppress the variation of the sustain discharge for every discharge cell as mentioned above, wall charge can be formed uniformly.

On the contrary, when the lighting rate is low, since the driving load is reduced and the distortion in the waveform is reduced, variation for every discharge cell in the sustain discharge does not easily occur. Furthermore, in this case, it is experimentally confirmed that when the number of continuously applying the second sustain pulse is reduced, an effect of reducing an after-image phenomenon can be obtained.

Thus, this exemplary embodiment has a configuration in which in the sustain period in which the lighting rate is not less than 85%, the second sustain pulse is generated eight times continuously as shown in FIG. 13A; and in the sustain period in which the lighting rate is less than 85%, the second sustain pulse is generated four times continuously as shown in FIG. 13B. This makes it possible to cause erase discharge stably regardless of the lighting rate.

Note here that this exemplary embodiment describes a configuration in which in the sustain period in which the lighting rate is not less than 85%, the second sustain pulse is generated eight times continuously; and in the sustain period in which the lighting rate is less than 85%, the second sustain pulse is generated four times continuously. However, this is just one example, and the threshold value of the lighting rate for changing the number of continuous generation of the second sustain pulse may be replaced by the other numerical values. For example, the number of continuous generation of the second sustain pulse may be changed between the sustain period in which the lighting rate is not less than 50% and that is less than 50%. Alternatively, a configuration in which the threshold value of the lighting rate is not less than two and the number of continuous generation of the second sustain pulses is changed by not less than three different times may be employed. These specific values may be optimized according to specifications of the plasma display devices, characteristics of the panel, or the like.

Note here that a configuration combining the second exemplary embodiment and the third exemplary embodiment may be employed. For example, in the sustain period in which the total number of the sustain pulses is less than 50, the second sustain pulse is generated four times continuously, and in the sustain period in which the total number of the sustain pulses is not less than 50, the second sustain pulse may be generated four times continuously when the lighting rate is less than 85%, and the second sustain pulse may be generated eight times continuously when the lighting rate is not less than 85% (not shown). This configuration can cause erase discharge stably regardless of the lighting rate and the total number of sustain pulses of the sustain period.

Note here that in the second and third exemplary embodiments, in the subfield in which the total number of sustain pulses applied to scan electrodes SC1-SCn does not reach 6 or 10, for example, a configuration in which the first sustain pulse is generated twice continuously and the rest of the sustain pulses are then generated as the second sustain pulse and applied to scan electrodes SC1-SCn may be employed. Herein, a subfield in which the total number of sustain pulses applied to scan electrodes SC1-SCn does not reach 6 or 10 is a subfield in which a predetermined number of sustain pulses are applied, and the predetermined number is a number of continuously generating the second sustain pulse (herein, four times or eight times) with the lower limit value (herein, twice) of the number of continuously generating the first sustain pulse immediately before the second sustain pulse is continuously generated added. Alternatively, by considering that the sustain discharge generated at the beginning of the sustain period is not easily generated as compared with the sustain discharge generated after sustain discharge is continuously generated, sustain pulses firstly applied to scan electrodes SC1-SCn in the sustain period may have a shape of the waveform so that priority is given to the generation of discharge. Then, the first sustain pulse is generated continuously twice, and thereafter, the rest of the sustain pulses may be generated as the second sustain pulse so as to be applied to scan electrodes SC1-SCn.

Note here that in the exemplary embodiments of the present invention, scan electrode drive circuit 43 and sustain electrode drive circuit 44 shown in FIGS. 5 and 6 are just one configuration example, and any circuit configuration may be employed as long as the same operation can be realized. For example, the circuit for applying voltage Ve1 and voltage Ve2 is not limited to the circuit shown in FIG. 6. For example, power supply for generating voltage Ve1 and power supply for generating voltage Ve2 and a plurality of switching elements for applying respective voltages to the power supply may be used so as to apply the respective voltage to sustain electrodes SU1-SUn at necessary timing. Furthermore, a circuit for generating an erase ramp waveform voltage as shown in FIG. 5 is just one configuration example, and it may be replaced by another circuit capable of realizing the same operation.

Note here that the exemplary embodiment of the present invention may have a configuration in which scan electrodes SC1-SCn are divided into a first scan electrode group and a second scan electrode group, and the address period is divided into the first address period and the second address period. Herein, in the first address period, a scan pulse is sequentially applied to the scan electrode belonging to the first scan electrode group. Furthermore, in the second address period, a scan pulse is sequentially applied to the respective scan electrode belonging to the second scan electrode group. That is to say, in at least one of the first address period and the second address period, to a scan electrode belonging to the scan electrode group to which a scan pulse is applied, a scan pulse changing from the second voltage that is higher than the scan pulse voltage to the scan pulse voltage and again changing to the second voltage is sequentially applied. Furthermore, to the scan electrode belonging to the scan electrode group to which a scan pulse is not applied, any of the third voltage that is higher than the scan pulse voltage and the fourth voltage that is higher than the second voltage and the third voltage is applied. While a scan pulse voltage is applied to at least adjacent scan electrodes, the third voltage can be applied. That is to say, it can be applied to the two-phase driving and the same effect as mentioned above can be obtained.

Note here that the exemplary embodiments of the present invention describe a configuration in which an erase ramp waveform voltage is applied to scan electrodes SC1-SCn.

However, when an electrode for applying the last sustain pulse is scan electrodes SC1-SCn, an erase ramp waveform voltage may be applied to sustain electrodes SU1-SUn. However, it is desirable that the exemplary embodiments of the present invention has a configuration in which an electrode for applying the last sustain pulse is sustain electrodes SU1-SUn and an erase ramp waveform voltage is applied to scan electrodes SC1-SCn.

Note here that the exemplary embodiments of the present invention describe a configuration in which in power recovery circuit 51 and power recovery circuit 61, rising and falling of the sustain pulse share one inductor. However, a configuration in which a plurality of inductors are used and different inductors are used between rising and falling in the sustain pulse may be employed. In this case, a configuration, in which an inductor is set so that the resonance cycle becomes about 1500 nsec in the above-mentioned power recovery circuit 51 and power recovery circuit 61, may be applied to an inductor used for falling. Furthermore, the inductor used for rising may have a resonance cycle different from that of falling, for example, a resonance cycle of about 1200 nsec.

Note here that specific numeric values shown in the exemplary embodiments of the present invention, for example, a voltage value of voltage Vers, a gradient of an erase pulse waveform voltage, and the like, are set on the basis of the property of a 42-inch panel having 1080 display electrode pairs. Therefore, the above-mentioned numeric values are just one example of the exemplary embodiment. The exemplary embodiments of the present invention are not limited to these numeric values and it is desirable that the values may be optimized according to characteristics of the panel, specifications of the plasma display devices, or the like. Furthermore, these numeric values are assumed to include variation in the range in which the above-mentioned effect can be obtained.

Industrial Applicability

The present invention is useful for a plasma display device with high quality of image display, which is capable of causing address discharge stably even in a panel having a larger screen and a higher resolution, and a method for driving a panel.

The invention claimed is:

1. A method for driving a plasma display panel that having a plurality of discharge cells including a display electrode pair composed of a scan electrode and a sustain electrode, the method comprising:

providing a plurality of subfields in one field period, each of the subfields including an initializing period, an address period and a sustain period; and applying a plurality of sustain pulses and an inclined up waveform to only one of the scan electrode and the sustain electrode in the sustain period, the inclined up waveform being applied at an end of the sustain period, the plurality of sustain pulses including:

a plurality of reference sustain pulses having a reference rise time and a reference fall time, the plurality of reference sustain pulses being applied in the sustain period, and a plurality of other sustain pulses having an other rise time that is shorter than the reference rise time and an other fall time that is longer than the reference fall time, the plurality of other sustain pulses being applied in the sustain period, wherein a predetermined number of the other sustain pulses determined by comparing a total number of sustain pulses in the sustain period to a threshold number of sustain pulses are continuously applied to the one electrode after the plurality of reference sustain pulses are applied to the one electrode.

2. The method for driving a plasma display panel of claim 1, wherein the inclined waveform voltage is a second inclined waveform voltage that has a steeper gradient than a first inclined waveform voltage in the initializing period of at least one subfield in one field period and is reduced immediately after an increasing waveform voltage reaches a predetermined potential.

3. The method for driving a plasma display panel of claim 2, wherein the sustain pulse rises or falls by allowing interelectrode capacitance of the display electrode pair to resonate with an inductor, and a time of falling period of the plurality of other sustain pulse is not less than 1.1 times of a half of a resonance cycle of the interelectrode capacitance and the inductor and less than the resonance cycle.

4. The method for driving a plasma display panel of claim 2, wherein the first inclined waveform voltage, the second inclined waveform voltage and the plurality of other sustain pulse are applied to the scan electrode.

* * * * *